United States Patent
Nolan et al.

(10) Patent No.: US 12,047,649 B2
(45) Date of Patent: Jul. 23, 2024

(54) DEVICES, SYSTEMS, AND THEIR METHODS OF USE IN GENERATING AND DISTRIBUTING CONTENT

(71) Applicants: James Scott Nolan, Del Mar, CA (US); James P. Cleary, San Diego, CA (US)

(72) Inventors: James Scott Nolan, Del Mar, CA (US); James P. Cleary, San Diego, CA (US)

(73) Assignee: FANMOUNTAIN LLC, Venice, CA (US)

( * ) Notice: Subject to any disclaimer, the term of this patent is extended or adjusted under 35 U.S.C. 154(b) by 0 days.

(21) Appl. No.: 17/477,438

(22) Filed: Sep. 16, 2021

(65) Prior Publication Data

US 2022/0217445 A1 Jul. 7, 2022

Related U.S. Application Data

(60) Provisional application No. 63/079,362, filed on Sep. 16, 2020.

(51) Int. Cl.
*H04N 21/472* (2011.01)
*H04N 21/443* (2011.01)
*H04N 21/858* (2011.01)

(52) U.S. Cl.
CPC ... *H04N 21/47205* (2013.01); *H04N 21/4431* (2013.01); *H04N 21/47217* (2013.01); *H04N 21/8586* (2013.01)

(58) Field of Classification Search
CPC ......... H04N 21/47205; H04N 21/4431; H04N 21/47217; H04N 21/8586; H04N 7/106;
(Continued)

(56) References Cited

U.S. PATENT DOCUMENTS 7,079,176 B1 * 7/2006 Freeman ............ H04N 21/2187
348/E7.039
7,587,214 B2 9/2009 Inselberg
(Continued)

FOREIGN PATENT DOCUMENTS

| EP | 2916273 A1 | 9/2015 |
| WO | 2017130039 A1 | 8/2017 |
| WO | 2019070351 A1 | 4/2019 |

OTHER PUBLICATIONS

S. Poslad et al., "Directing your own live and interactive sports channel," 2009 10th Workshop on Image Analysis for Multimedia Interactive Services, London, UK, 2009, pp. 275-279, doi: 10.1109/WIAMIS.2009.5031486. (Year: 2009).*

(Continued)

*Primary Examiner* — Cynthia M Fogg
(74) *Attorney, Agent, or Firm* — James Scott Nolan

(57) ABSTRACT

This document presents a comprehensive interactive platform for generating content, and for formulating and broadcasting communications pertaining thereto. The content may be generated by a variety of mechanisms, in a multiplicity of forms, and may be related to a number of different activities. For instance, the content to be generated may pertain to a performance of an activity, the activity may be an athletic event, and the format in which the content is collected may be one or more images, such as in the form of a video. In various instances, the video may be annotated with comments from a commentator, for example, where the comments are directed to evaluating the performance.

20 Claims, 1 Drawing Sheet

(58) Field of Classification Search
CPC ........... H04N 21/2187; H04N 21/4223; H04N 21/23418; H04N 21/44008; H04N 23/90; H04N 13/117; H04N 21/4781; H04N 21/6587
USPC .......................................................... 725/37
See application file for complete search history.

(56) References Cited

U.S. PATENT DOCUMENTS

| | | |
|---|---|---|
| 8,442,424 B2 | 5/2013 | Socolof |
| 8,678,899 B2 | 3/2014 | Hu |
| 9,009,194 B2 | 4/2015 | Lang et al. |
| 9,033,781 B2 | 5/2015 | Steir et al. |
| 9,044,183 B1 | 6/2015 | Karam |
| 9,066,144 B2 | 6/2015 | Yerli |
| 9,165,073 B2 | 10/2015 | Kiraz et al. |
| 9,462,030 B2 | 10/2016 | Lueth et al. |
| 9,751,018 B2 | 9/2017 | Colony et al. |
| 10,220,290 B1 | 3/2019 | Podolosky et al. |
| 10,322,330 B2 | 6/2019 | Wanke et al. |
| 10,653,934 B2 | 5/2020 | Wanke et al. |
| 11,285,372 B2 | 3/2022 | Wanke et al. |
| 11,465,029 B2 | 10/2022 | Wanke |
| 2002/0165630 A1 | 11/2002 | Arthur et al. |
| 2004/0171381 A1 | 9/2004 | Inselberg |
| 2007/0018952 A1 | 1/2007 | Arseneau et al. |
| 2008/0126197 A1 | 5/2008 | Savage et al. |
| 2008/0154625 A1 | 6/2008 | Serbanescu |
| 2008/0242271 A1 | 10/2008 | Schmidt et al. |
| 2008/0311996 A1 | 12/2008 | Belton et al. |
| 2009/0087161 A1* | 4/2009 | Roberts .................. H04N 5/262 386/285 |
| 2012/0022918 A1 | 1/2012 | Ross |
| 2012/0126973 A1 | 5/2012 | DeAngelis et al. |
| 2012/0179557 A1 | 7/2012 | Gross |
| 2013/0185802 A1 | 7/2013 | Tibeica et al. |
| 2013/0203499 A1 | 8/2013 | Oh |
| 2014/0004959 A1 | 1/2014 | Kahrs et al. |
| 2014/0089960 A1 | 3/2014 | Farah |
| 2014/0100007 A1 | 4/2014 | Kelly |
| 2014/0156752 A1 | 6/2014 | Fetyko |
| 2014/0164075 A1 | 6/2014 | Trujillo |
| 2014/0164954 A1 | 6/2014 | Romanowski |
| 2014/0186004 A1* | 7/2014 | Hamer .................. G11B 27/32 386/223 |
| 2014/0278834 A1 | 9/2014 | Lautz et al. |
| 2014/0364981 A1 | 12/2014 | Hofstetter et al. |
| 2014/0365573 A1 | 12/2014 | Gass et al. |
| 2015/0165320 A1 | 6/2015 | Perlman et al. |
| 2015/0251095 A1 | 9/2015 | Perrin |
| 2015/0302850 A1 | 10/2015 | Lebrun |
| 2015/0334529 A1 | 11/2015 | Jain et al. |
| 2015/0350733 A1 | 12/2015 | Persidis |
| 2016/0004724 A1 | 1/2016 | Har-Noy et al. |
| 2016/0105782 A1 | 4/2016 | Barbulescu et al. |
| 2016/0171514 A1 | 6/2016 | Frank et al. |
| 2016/0180282 A1 | 6/2016 | Basalamah et al. |
| 2016/0224565 A1 | 8/2016 | Hardas et al. |
| 2016/0234556 A1 | 8/2016 | Berridge |
| 2016/0239198 A1 | 8/2016 | Shenkler |
| 2016/0247537 A1* | 8/2016 | Ricciardi ............... G06V 20/42 |
| 2016/0287987 A1 | 10/2016 | Onda et al. |
| 2016/0381306 A1 | 12/2016 | Yang et al. |
| 2017/0025152 A1* | 1/2017 | Jaime ................... H04N 21/854 |
| 2017/0087468 A1 | 3/2017 | Jayaraman |
| 2017/0147277 A1 | 5/2017 | Carney et al. |
| 2017/0223415 A1 | 8/2017 | Jeon |
| 2017/0244985 A1* | 8/2017 | Masterson ......... H04N 21/2187 |
| 2017/0282077 A1 | 10/2017 | Cruz |
| 2018/0004966 A1 | 1/2018 | Chan et al. |
| 2018/0077438 A1 | 3/2018 | Hansen et al. |
| 2018/0205906 A1* | 7/2018 | Boyle .................. G11B 27/031 |
| 2018/0345149 A1 | 12/2018 | Farudi et al. |
| 2019/0099653 A1* | 4/2019 | Wanke ..................... G07C 1/22 |
| 2019/0109975 A1* | 4/2019 | Linderoth .............. H04N 5/232 |
| 2019/0110112 A1* | 4/2019 | Maloney ................ G06V 20/42 |
| 2019/0147703 A1* | 5/2019 | Malek ................... G07F 17/326 463/20 |
| 2019/0268625 A1* | 8/2019 | Jeon ................... H04N 21/8586 |
| 2019/0371273 A1 | 12/2019 | Benedetto et al. |
| 2020/0107075 A1* | 4/2020 | Davies ............. H04N 21/23418 |
| 2021/0019982 A1* | 1/2021 | Todd .................. H04N 21/2343 |
| 2021/0101068 A1 | 4/2021 | Nanke |
| 2022/0331682 A1 | 2/2022 | Wanke |
| 2022/0176225 A1 | 6/2022 | Wanke |
| 2022/0217445 A1 | 7/2022 | Nolan et al. |

OTHER PUBLICATIONS

U.S. Appl. No. 17/963,118, filed Oct. 10, 2022, Todd Wanke.
Chiuo Aachen, Aachen 2015, https://itunes.apple.com/us/app/aachen-2015/id1014414655?mt=8, retrieved Jan. 18, 2019, 4 pages.
CrowdScores Ltd, CrowdScores—Live Scores, https://itunes.apple.com/app/apple-store/id773137002?mt=8, retrieved from Web Jan. 18, 2019, 3 pages.
Daley et al. "System for audience participation in event scoring at the 2004 Olympic Gams." In: CHI'04 Extended Abstracts on Human Factors in Computing Systems. Apr. 29, 2004 (Apr. 29, 2004) Retrieved from entire document.
Fastest Live Scores; FastestLiveScores, https://fastestlivescores.com/about-fastest-live-scores/, retrieved Jan. 18, 2019, 3 pages.
Hippo data GmbH; WIHS 2015 Audience Judge—WIHS Equitation Finals, https://appadvice.com/app/wihs-2015-audience-judge-wihs-equitation-finals/1044336809, retrieved Jan. 18, 2019, 4 pages.
ISA/US, International Search Report and Written Opinion for PCT/US18/048415, Mailing Date Nov. 1, 2018, 24 pages.
Ribeiro, et al, Crowdmos: An Approach For Crowdsourcing Mean Opinion Score Studies, University de Sao Paulo, Brazil and Microsoft Research, Redmond, WA, 4 pages.
Scorestream, Inc., Scorestream, https://scorestream.com/about, retrieved from Web Jan. 18, 2019, 5 pages.
Tokbox, Datasheet: Interactive Broadcast API, https://tokbox.com/interactive-broadcast, retrieved Jan. 19, 2019, 4 pages.

* cited by examiner

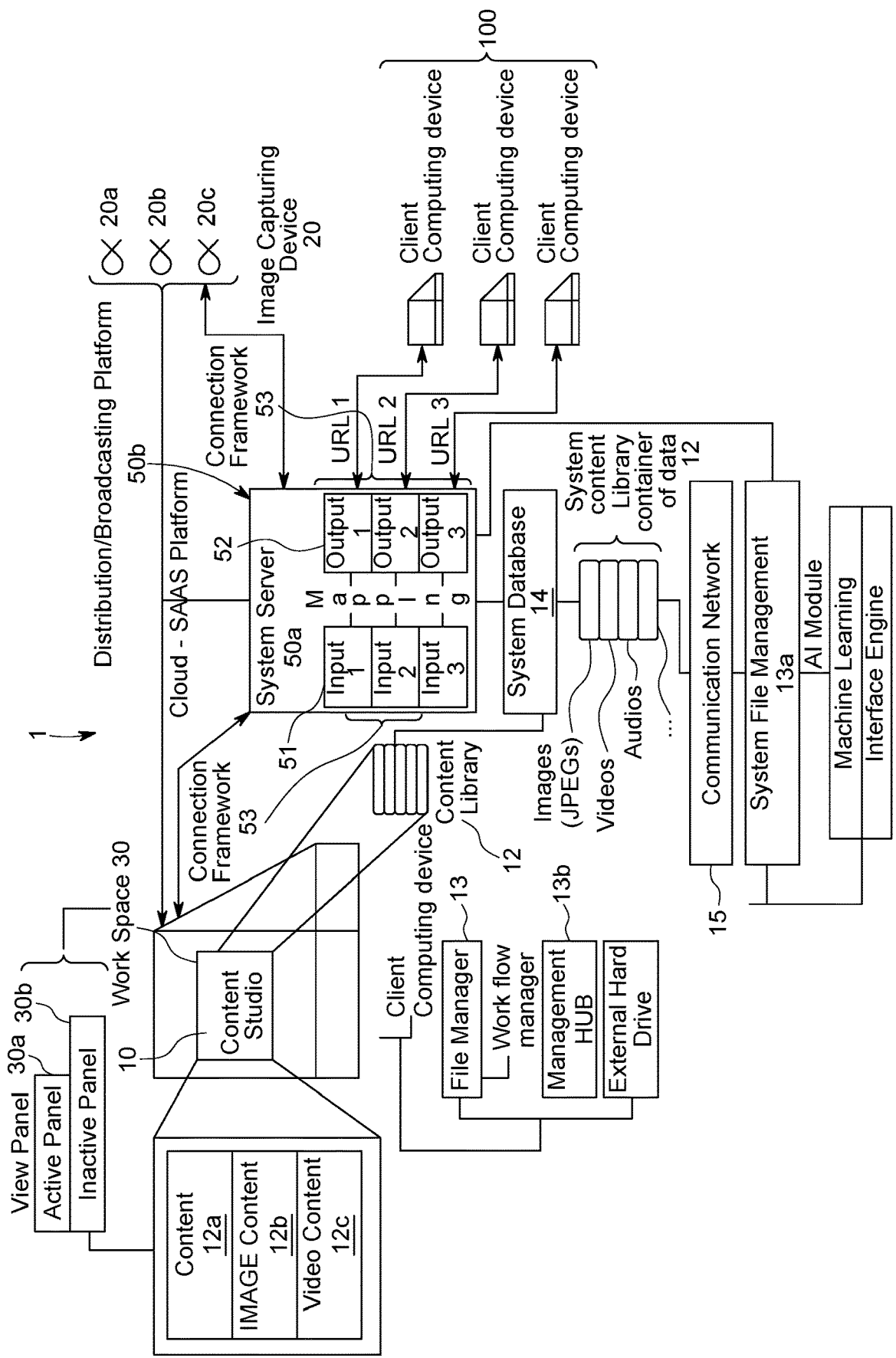

DEVICES, SYSTEMS, AND THEIR METHODS OF USE IN GENERATING AND DISTRIBUTING CONTENT

CROSS REFERENCE TO RELATED APPLICATIONS

The present application claims the benefit of U.S. Provisional Patent Application No. 63/079,362, filed Sep. 16, 2020, entitled "Devices, Systems, and their Methods of Use for Content Generation and Broadcasting"; the disclosure of which is incorporated herein by reference in its entirety.

BACKGROUND

The following description of the background of the disclosure is provided simply as an aid in understanding the disclosed technology and is not admitted to describe or constitute prior art to the appended claims herein.

Entertainment and Athletic events are an important part of society. From children to teenagers to adults, a large part of modern populations participate in one or more entertaining and/or athletic events. And for those who do not actually physically participate in the events, the vast majority of them, nevertheless, enjoy watching and/or listening to those who do. Entertainment events can involve various aesthetic activities, including listening to music, viewing art or theatrical performances, fashion, and beauty, as well as engaging in entertaining activities, such as gambling. Performance events, such as dance or gymnastics or ballet, and the like may be considered as both an aesthetic and an athletic event. Sports are athletic events and include ball games, such as: baseball, football, soccer, tennis, lacrosse, and the like; sports also include man vs. man competitions, such as those events included in the Olympics, such as track and field, boxing, judo, golf, cycling, and the like; and additionally, such events can include races, such as bike, horse, car, or boat races, and the like. Additional sporting events include water-based competitions such as swimming, diving, surfing, and the like. Other events can include betting events, including gambling, racing, e.g., cars, boats, planes, horses, dogs, and the like. Gaming platforms, such as video gaming are also events the viewership of which are growing vastly in popularity. A couple of common threads that connects all of these diverse activities is both an aesthetic of expertise, the spirit of fair competition, and the fact that each performer and/or competitor, team or individual, is judged and/or the competition itself is governed by a referee.

A problem with such judging and/or refereeing and/or betting is that reasonable minds may disagree as to whether the rules were followed by the competitors or performers, whether the performance was at a certain level, whether a ruling was accurate or not, and the like. These differences can be as mild as a difference in opinion, or may indicate a discrepancy that itself may be as mild as an implicit to as worrisome as an explicit bias. In fact, these discrepancies become even more exacerbated when the specter of bias or cheating rears its ugly head. A further problem is keeping the viewing audience engaged during the course of the performance.

Particularly, crowd engagement is not only a good metric of the entertainment's or sport's popularity, it is also a necessary component for attracting the most skilled and competent participants, as the more fan engagement there is, the more advertisers will be willing to pay to sponsor such events, and the more competitors may gain by their participation in the competition. Likewise, the more competitive the performance or competition is, the more exciting it will be to watch, and, thus, the more fans will want to view the event, which in turn will lead to greater amount of advertiser dollars being spent to sponsor such events in the future. However, where there is little to no audience interaction, there is likely going to be declining audience engagement. Another problem affecting the ability of fans to remain engaged in a competitive event is due to the recent outbreak of the pandemic, which prevents potential fans from actually attending the event, and thus, prevents them from feeling the synergy of being part of a crowd. And further, where there is a lack of real-time transparency in the judging process, coupled with a lack of uniformity between judge scoring, the competitors are left to the mercy of the judges, and audience engagement suffers, along with sponsorship, due to perceived bias.

Accordingly, what is needed are the means and methods for increasing viewing engagement amongst a crowd of spectators, whether at the event or far from the event, promoting fairness and enhancing sponsorship as well as more targeted advertising, while at the same time increasing transparency in competition, and decreasing bias amongst the judging faculty. In essence, entertainments, competitions, and the judging of such, needs to be modernized in a manner that more greatly involves the viewer, the participants, sponsors, and/or advertisers and their interactions, as much more intimate and intrinsic partners in the event. The present devices, systems, as well as their methods of use have been configured to overcome these and other such problems in the art. Accordingly, the goal of the technologies described herein is to solve these and other such problems faced by event organizers, sponsors, advertisers, and/or the audience of such events, for instance, to promote audience and participant engagement and minimize bias in the judging of such events.

SUMMARY

This document presents a content generation and distribution studio. Hence, in various instances, implementations of diverse aspects of the disclosure may include, but are not limited to: apparatuses, systems, and methods of their use including one or more features as described in detail herein, as well as articles that comprise a tangibly embodied machine-readable medium operable to cause one or more machines (e.g., computers, etc.) to result in operations described herein. Similarly, computer systems are also described that may include one or more processors and/or one or more memories coupled to the one or more processors. Accordingly, computer implemented methods consistent with one or more executions of the current subject matter can be employed by one or more data processors residing in a single computing system or multiple computing systems containing multiple computers, such as in a computing or supercomputing bank.

Such multiple computing systems can be connected and can exchange data and/or commands or other instructions or the like via one or more connections, including but not limited to a connection over a network (e.g. the Internet, a wireless wide area network, a local area network, a cellular network, a wide area network, a wired network, a WIFI or Bluetooth network, a physical electrical interconnect, or the like), via a direct connection between one or more of the multiple computing systems, etc. A memory, which can include a computer-readable storage medium, may include, encode, store, or the like one or more programs and/or a set of instructions, that cause one or more processors, e.g., processing engines, to perform one or more of the operations associated with one or more of the processes, methods or procedures, e.g., algorithms, described herein.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

Accordingly, in one aspect, presented herein are systems, apparatuses, and methods for implementing an interactive, crowd-sourced viewing, commenting, judging and/or scoring platform that is configured for both enabling and encouraging audience and/or participant engagement when performing and sharing in, e.g., as an observer or performer, an athletic event, theatrical performance, and/or any other form of competitive interaction or source of entertainment. Particularly, it is understood that many people enjoy watching competitions and/or entertaining performances, however, there are others who do not, or grow bored doing so throughout the course of the event. Hence, crowd engagement with an observed event may start off strong, but through the course of the day, as the event progresses, audience participation and engagement may begin to wane. The devices, systems, and their methods of use, as provided herein, are adapted for enhancing and improving such engagement through providing mechanisms and methods for more immediate and collective fan participation in the event, thereby promoting a social collaboration between participant actors, e.g., those performing the event, and participant scorers, e.g., those informally judging the event.

More particularly, such interactions are enhanced through use of real-time polling, voting, commenting on, tagging, and sharing of contemporaneous opinion and results data and commentary, and the predictive analysis, and/or betting opportunities proffered by the present systems. Additionally, the devices, systems, and methods of using the same, as disclosed herein, are adapted for making the viewing, commenting, judging and/or scoring of competitive events, be they sporting events, theatrical performances, or even election results (e.g., official and/or unofficial), more engaging, as real-time messaging, commenting, and results are obtained in an ongoing manner, but also more transparent and accurate, such as by keeping the judging and/or voting system more accurate.

Accordingly, in one aspect, presented herein is a system of platforms for generating user interaction with a system, such as where the system is directed to present and/or engage with an event, such as an athletic or other entertainment event. In these instances, a user may be a spectator, e.g., a fan, a participant or performer, an event organizer, a sponsor, an advertiser, a commentator, an evaluator, e.g., a coach, a bettor, or other interested third party, any of which can be termed an observer or participant or actor, based on the contextual circumstances. In particular implementations, the system of platforms may include a fan engagement and/or scoring platform, a commenting and/or messaging platform, an event organizing and/or scheduling platform, a content generating and/or messaging platform, an evaluating and/or coaching platform, an editing platform, and a broadcasting platform. Additional platforms may also be included.

The platforms may be organized in a manner so as to engage a passive spectator, or other observer, and convert them to being an engaged viewer, and further into an active influencer with respect to the platform, and/or into a passionate fan of the platform, its activities, and the events in which it engages. In a manner such as this a spectator not only observes, but becomes a fan of the event, such as by becoming more of an engaged participant, such as a judge, a scorer, and/or a commentator of the event through the mechanisms of the platform, its systems, and devices. Likewise, the system and its components may be configured for allowing the observer to film participants in an event, thereby turning them into photographers and/or videographers capable of capturing images and videos that may be transmitted to the system, edited, commented on, and/or broadcast to other system users for viewing.

Further, the received user generated content, evaluations, messaging, commentary, images, video content, and the like may be received by the system and may be broadcast directly to other users, or may be presented for further engagement by a platform user. For instance, one of the platforms may be configured as a commenting, evaluating, and/or coaching platform that is configured for allowing a system user to engage with the received content, manipulate it, edit it, and the like, prior to distributing it to one or more other system users. In essence, in certain instances, the goal of the system and its various platform is to allow observers to become participants in the events to which they watch, such as by becoming part of the action, such as through livelier interaction and/or communication with the platform system.

Furthermore, in various instances, audience engagement may be enhanced through one or more rewards, betting, and/or gambling regimes, which are directed to rewarding audience participation, actor participation, and/or judging consistency, and/or for allowing the audience to be more intimately engaged in the course and outcome of the performance and/or event. Specifically, in one implementation, a probability module may be included for determining a range of potential outcomes, and for determining the likelihood that any outcome could actually occur, such as by representing a probability that an identified outcome may occur, such as for example, the chances that a given likelihood that Event C will happen given the facts that Events A+B have already occurred, such as where Event C represents a limited number of potential outcomes that can happen, and can be quantified, and then be represented by a probability.

Further still, one or more of the tools set forth herein can be used to promote fairness in judging, but also may be used to allow various system users to engage with collected content, such as by commenting thereon, and then forwarding the commented content to one or more other system users, such as in a coaching module. In certain instances, the system may be configured for broadcasting received content to one or more users, such as via transmission of one or more webpage links. Additionally, the system may be configured so as to better promote more relevant advertisement generation and distribution, such as to better target participant consumers and reward participant actors who are sponsored.

Accordingly, in one aspect, provided herein is a system for editing or otherwise engaging with content received by a system user. For instance, in various embodiments, a content studio may be provided, such as where the content studio presents a content library exhibiting therein a selection of content, such as image and/or video content, which can be selected for engagement by a user of the content studio. In such an instance, multiple users of the system can be engaging with the platform all at the same time, such as one or more persons participating in the event, one or more persons providing real-time feedback or coaching, and one or more persons judging, commenting on, and/or betting on the event, and the like.

The content, e.g., image or video content, may be collected or otherwise received by the content studio from one or more inputs, such as from one or more data feeds, such as an image capturing devices, e.g., video cameras, in communication with the content studio. For example, the image capturing device may be an official video camera filming the event, or may be an endogenous video camera of a spectator's mobile device, or voice commentary, and/or photographs being taken and subsequently transmitted, such as in near real-time. Likewise, the content studio may present a work space for engaging with the selected content.

Particularly, the work space may be a computing device that presents one or more interactive view panels that are configured to display a selection of content, such as video content that can be received as input from a live-stream or from a content library. In various instances, the received and/or otherwise retrieved content can be configured so as to be acted upon, such as for near real-time editing and/or commenting.

The content studio, therefore, may further include at least one of a streaming control and/or an output control to respectively control streaming and/or output of the commentary, imaging, or video content from the content studio. More particularly, in various embodiments, the content studio may include one or more inputs and one or more outputs. For instance, the content studio 10 may include an input 51 for receiving captured, or otherwise retrieved content, such as image 12b and/or video content 12c, and may further include one or more outputs 52, such as for transferring the retrieved content to a system distribution and/or broadcasting platform, such as for real-time streaming and/or distribution. Consequently, a connection framework 53 may also be included where the connection framework 53 is configured for establishing a connection between one of the one or more interactive view panels 30a and 30b of the content studio 10 and a selected input channel 51 of the one or more inputs of the distribution broadcasting platform 50 of the System Server, such as based on an application programming interface (API) call from the content studio 10 to the distribution broadcasting platform 50. Further, as described below, once configured as desired, the configured end product can be adapted for transmission, such as being directed to one or more output channels.

Accordingly, the system may include a distribution or broadcasting platform that is configured for receiving content, such as content to be distributed, and for broadcasting, or otherwise distributing the received and/or edited content. For example, the broadcasting platform may be configured for receiving one or more inputs and directing the input to one or more available outputs, such as for transmission to one or more recipient devices over the Internet, such as in substantial real-time. In various instances, the content can be configured for direct transmission to a recipient such as over a cellular network and/or as a packet to be sent via a web interface, such as via a transmitted link. Specifically, one or more of the one or more inputs may be configured for receiving selected video content from the content studio, and one or more of the one or more outputs may be configured for transmitting a uniform resource locator (URL) to the recipient device, whereby the video, or other content, can be viewed on the recipient device such as by engaging an active link, such as by clicking on it.

More specifically, in various instances, the broadcasting platform may include a mapping module configured for mapping one or more open input channels to at least one of the one or more output channels. In particular instances, the transmitted URL is configured for generating a web site that automatically formats and renders the received content. Hence, the client computing device may be configured for displaying the selected content, e.g., video content, via the rendered URL. In various instances, the video content can be broken down into component parts, and be sent separately and/or sequentially to one or more nodes, whereby upon receipt the content can then be reassembled. In particular embodiments, a template containing one or more containers can be configured to receive the content along with instructions as to how to reassemble the content into its original form so as to increase speed and reduce bandwidth.

In various instances, the content studio may include a content management hub configured for identifying, characterizing, classifying, and/or otherwise managing the received inputs. For instance, in certain instances, the received content may be image and/or video or voice content, and may further include other data, including metadata, pertaining to the video content or to the other data related to the events and/or performers participating in the events captured in the image content. Hence, in various embodiments, the content studio may be configured for receiving and categorizing the received content. In particular instances, the data to be received may include details of an event, such as details including one or more of a time, duration, schedule, location, and/or identification of the event and/or one or more participants of the event. Accordingly, in such an instance, the system and/or the content studio of the system may be configured to tag the video content according to one or more of the time, the duration, the location, the identification, the schedule, the participants, and/or the other data related to the event.

The details of one or more embodiments are set forth in the accompanying FIGURES and the description below. Other features and advantages will be apparent from the description and drawings, and from the claims.

BRIEF DESCRIPTION OF THE DRAWINGS

These and other aspects will now be described in detail with reference to the following drawings.

FIG. 1 shows a comprehensive interactive system and platform for collecting data as a system input as well as for formulating a communication out of the collected data, which communication can then be broadcast to one or more client computing devices for viewing thereby.

DETAILED DESCRIPTION

In view of the above, provided herein is an interactive, crowd-source communication engagement platform, such as for capturing, interacting with, manipulating, editing, commenting on, evaluating, scoring, judging, retrieving, and/or transmitting one or more data packets, e.g., images, captured at one or more content mediums. In various embodiments, the captured content may be voice or image based. Particularly, the captured content may be narrative or images that are directed to the performance of an activity, such as by an actor and/or competitor or performer and/or other participant in a routine, such as in a theatrical presentation or athletic competition or game of chance. For instance, the engagement of a user with the content through the system may be within the context of evaluating the captured performance, such as for the purpose of scoring and/or coaching the performer and/or for placing one or more bets thereon. The platform may be implemented on a computing device, such as one or more of a remote server, a desktop computer, a tablet computer, mobile phone or personal digital assistant, smart watch, ring, glasses, and the like.

Accordingly, as can be seen with respect to FIG. 1, in one aspect, a system is provided for performing one or more of the following operations related to the capturing, engaging with, and distributing content. The system may include one or more, such as a plurality, of computing devices that may be interconnected over a network connection via a direct connection therewith, such as via a network connection or via the operation of an application running on one or more of the attendant devices. For instance, one or more of the devices of the system may include a data, e.g., commentary and/or image capturing device, a desktop computer, a heads up display (HUD), a tablet computing device, a handheld, mobile computing device, a coaching or evaluation interface, an analytics interface, as well as one or more displays.

Particularly, in particular embodiments, the system may include one or more of the following components. For example, the system may include a data collector, e.g., an image, voice, or text capturing device, such as a camera or voice input device, e.g., an audio recording, still or video camera, and the like, which image capturing device is configured for capturing or otherwise collecting one or more audio recordings or images, such as of a performer and/or competitor engaging in an activity in an event and/or watching the same. The activity may be any form of activity such as presented as a formal or informal event, such as a professional or amateur competition, or a mere collection of two or more friends or acquaintances engaging in a friendly competition, performance, or other activity, such as an activity that may include gambling and/or betting. In any of these instances, the engagement system may be employed so as to allow event participants and viewers to watch the event, capture images of participants, post or otherwise transmit the images, compare, comment on, and/or edit the posted images, and then transmit them to one or more recipients, which may be participants in the event, e.g., such as prior to or during the event.

Accordingly, the system may be configured for providing a plurality of portals, inputs, or channels, through which the system, e.g., a content studio server thereof, may be accessed. For example, a coaching and/or administrative portal, e.g., provided by an interactive touch screen display, tablet, or other computing device of the system, may be set up so as to allow a user of the system, e.g., a coach, event organizer, a participant, to set up an event, performance, and/or competition, as well as to receive data pertaining to the event, such as for receiving real-time performance data, e.g., voice or image data.

As indicated above, the event may be any active event or activity, such as a theatrical performance, a betting or gambling event, an athletic performance, a professional or amateur sporting event, e.g., an NCAA or Olympic competition, and the like. In such an instance, the event organizer, other system administrator, coach, commentator, and/or participant, may engage the system to set up parameters in an open format where by tens, or hundred, thousands, hundreds of thousands, or millions of fans can watch, e.g., via the application, and can engage with the competitors or performers and each other, and, further, where a coach, commentator, or instructor may engage with the content of the event, such as prior to its distribution via the platform.

The data input device may be any form of data collector, such as an image capturing or audio device, which may be any device capable of capturing or otherwise collecting one or more images. For instance, in various instances, one or more image capturing devices may be included where the image capturing device itself is a smart device, such as having an image or voice collecting apparatus, a processor, a memory device, a power source, e.g., a battery, such as a rechargeable battery, a GPS device or other geographic locater, a mobile device identifier, an electromagnetic signal transmitter and/or transponder, e.g., RFID, a display screen, e.g., a capacitive sensing touch-screen display, an input device for entering information into the device, a microphone, a speaker, an amplifier, and the like. An output device may also be includes, such as where the system includes a communications module for receiving and transmitting communications and other data, including a receiver, a transmitter, and/or a BLUETOOTH®, low energy BLUETOOTH®, WIFI emitter, a transmitter, for sending captured recordings or live streaming audio or images to a recipient device, e.g., over a network, and the like, such as for transmitting one or more of the captured images and/or audio, via a wired or wireless connection, e.g., a wireless network connection.

A unique feature of the present system, with respect to the content capturing device, is that the system is able to recognize various of a wide variety of input devices capable of capturing and/or transmitting data, such as audio or image data, into the system, and mapping that data to one of several different input channels. For instance, a central feature of the system is a client application, e.g., including machine operable instructions, which application may be downloadable, or otherwise uploaded onto a device, including an image capturing device of the system. The system may also include a server system, e.g., a front end or backend server, that further includes one or more corresponding applications, whereby via the application, the system can identify and recognize any device employing the application as a potential input, or source for data that can be entered into the system, and/or can further be identified as a recipient device for receipt of content, such as from one or more output channels.

In a manner such as this, any device having the application downloaded and/or coupled with its processing functionality, may be queried by the server with respect to whether the device includes an audio and/or image capturing facility such that the device may serve as an input source for content. Such captured audio, images, and videos may queried, identified, and may then be transmitted from that capture device to the server, such as via a management hub, whereby received content can be directed to a content studio for engagement therewith, after which the product content can then be directed to one or more output channels. Hence, in various embodiments, the system may include a mobile computing device, such as a smart phone having a camera, whereby the camera, and/or audio and images captured thereby may be identified and employed as an input into the system, and/or may be configured as a recipient device for viewing transmitted content. Consequently, now anyone with a suitably configured mobile computing device, e.g., with audio and image capturing capability, may be employed by the system as a content generator and/or content consumption device.

The server may be a single server, or a plurality of servers, such as a server rack. The server system may include a front, mid, or backend server. In various embodiments, the server may be configured as a content collector, content studio, and/or an engagement platform, such as for fan and/or judge and/or evaluator engagement. In such an instance, the content studio is not only adapted for identifying, and communicating with an input capturing device associated with the system.

Additionally, one or more servers may further be configured to communicate with one or more output channels and a plurality of other content recipients, such as client computing devices, running the client application discussed herein, so as to receive data, view and/or watch the data, e.g., via in a streaming and/or via a URL. In this manner one or a plurality of users may view the content and/or perform one or more of the disclosed functionalities, such as for commenting on and/or judging the content. For instance, the client application can be downloaded or otherwise installed on a client computing device and thereby serve as a portal for a plurality of users to access the server system functionalities.

Consequently, the server system(s) may be configured so as to from a content studio that may serve as an interactive, crowd-source communication and engagement platform by which to interact with, or otherwise engage with, other users and various of the collected content of the system. By engaging with the content studio a user can engage with a performer performing in an activity and/or may engage with others viewing the activity and/or may engage with the content directly, such as prior to its re-distribution. For instance, in one instance, a first user of the system may be a competitor in an event being hosted by the system, whereby the first user is associated with an image capturing device, so as to capture images of their performance in an event such as through a first-person point of view, such as where the image capturing device is running the executable application or is otherwise associated with the system, such as via a network connection.

In a further instance, a second user may be a coach, commentator, or instructor who may engage the content studio so as to interact with the content, such as to provide coaching and instructions therewith, such as prior to its distribution. Additionally, a third user may be someone on the recipient side of the distribution, whereby the user may view and/or engage with the content, such as by placing one or more bets thereon. In other instances, the second or third user may be an observer in the crowd with a mobile phone who is watching and engaging with the event through the client application or live streaming the event, such as through a camera of their device.

Hence, a user of the system may be filming the event through the phone's associated camera. In such an instance, the system may recognize both the camera of the first user, e.g., of a participant, such as from a point of view aspect, and may further recognize the phone of the observer. Particularly, the system may be configured so as to identify and segregate individual inputs, and may then start receiving the captured images of the performer's camera and observer's phone, and may then may the captured input to a plurality of different input channels. In a manner such as this, the first and second and/or third users may be enabled to transmit captured images from their image capturing devices to the system, via the application, such as from a performer and/or fan and/or coaching perspective.

Accordingly, a user of the system may be a commentator, a coach, an instructor, or other person engaging with the system, such as via an interface of the content studio, in a manner so as to receive the content, interact with the content, and then distribute the content to one or more selected user recipients. The content can be audio and/or image content that is received by the system such as via an input channel, which content can be collected from one or more or all of the participant, official video capture, and/or fan content capture. In such an instance, the content may be received by the content studio via being directed to one or more input channels. Once received the content can be evaluated, such as via a suitably configured analytics engine, e.g., artificial intelligence module, or it may be interacted with directly by a user, such as a coach or commentator. In such instances, the input content can be ranked for relevancy and/or be presented to the user for evaluation and/or editing prior to being directed to one or more output channels. In a manner such as this, the system and a user thereof can select the content to be engaged with and/or transmitted, such as based on one or more metrics and/or parameters, e.g., metrics evaluating the content as well as one or more relevancy parameters, such as relevancy pertaining to one or more determined objectives sought to be achieved by a user or system objective. Additional users may include recipients of the content, which may then engage with the content and resend it, such as back to the content studio for further engagement and/or transmission.

In some embodiments, the event may be an informal event, and the capturing of images may be via a handheld camera, such as a mobile phone having a camera, whereby the client application accesses the phone's endogenous camera to capture the images of the various performers in the event and to transmit the captured images to the engagement system server. In any instance, the server system may include a plurality of application programming interfaces (APIs) that are configured for allowing an administrator, event organizer, or other user of the system to permit an image capturing system, whether it be a high-tech camera system, e.g., at a major league event, or a camera of a handheld mobile computing device of a spectator or participant, to access the system and transmit the captured images, via one or more input channels to a system server, via a suitable network, e.g., internet, connection. Once received and/or engaged with, the captured and/or annotated images may then be broadcast, e.g., via the content studio and/or client application, to other system users for viewing and/or engagement thereby.

On the recipient side, in addition to the image capturing device, server, e.g., mid or backend server system, and/or content studio system, the overall fan engagement system may include a client computing device, such as a mobile telephone or tablet or desktop or box set computing device. In such an instance, the type of computing device is selected or otherwise depends, at least in part, on the types of engagement by which the various diverse users will interact with the platform. For instance, a user of the system, such as a fan, a participant, a commentator, an Official judge, a coach, or even a spectator may engage with the platform via a computer, e.g., a smart phone, a laptop or tablet computer, such as for viewing, evaluating, judging, commenting or coaching on, and/or scoring various different competitors in their performances, such as athletes or even poker players in an event, e.g., via an engagement, commenting or scoring, module of the system. In such an instance, the engager may employ an interface, e.g., a dashboard interface, presented at a graphical user interface of the computing device, so as to enter one or more judgments, evaluations, or instructions to one or more performers participating in the event, or to other users.

In a particular instance, once content has been received by the system, a coach, instructor, or commentor of the system may engage the content, e.g., via the content studio, such as by employing one or more engagement tools. For instance, the content studio may include one or more tool sets, such as editing tools, whereby the received and/or retrieved content may be edited, such as prior to being transmitted to a recipient device. In some instances, the retrieved and/or received content may be video content, e.g., streaming content. Likewise, an observer of the event may also engage the platform, either on the front or back end, via a handheld mobile device, such as to film, score, and/or comment on the performances, and/or to engage with other observers, such as via direct messaging through the app. Additionally, a front end user may engage with the system directly, such as where the user is a participant in the event and the system includes a smart watch, bracelet, ring, or even smart glasses that are configured for being worn, e.g., by a competitor or observer of the event, so as to indicate when a performance is to take place, what type of activities should be performed, receive real time instructions, coaching, and/or commentary, or other performance data, as well as to measure various competitor characteristics, bio-physiology data, and the like that can then be fed into the system, e.g., via an input into the content studio.

In any of these instances, the platform may be presented to a as a graphical user interface at a screen of one or more devices of the system, such as via one or more display panels, and in various instances, the content studio may be accessed directly via an associated client computing device, or it may be accessed by a client application running on a client computing device. Particularly, in various embodiments, the platform may be implemented by a client application program, such as a downloadable application, or other set of executable instructions. The instructions may be such that they direct the actions of one or more processing engines of a computing device of the system in the performance of the functioning herein described, such as for judging, evaluating, commenting on, coaching, and/or like activities of an observer observing the activity of the event, either watching the event live or via the client application. More particularly, the computing device may include one or more, e.g., a set of, processing engines that are configured for implementing instruction for generating a graphical user interface into which the observer's judging, commenting, coaching, betting, instant messaging, and/or other activities regarding describing one or more characteristics of one or more activities by a performer in the event may be entered and/or be transmitted, such as through an input or output channel of the content studio.

As such, the content studio of the system may be configured for receiving a data feed, such as a video feed, e.g., from a plurality of inputs, evaluating the quality of one or more of, e.g., each of the feeds, determining the most salient features of the feeds, e.g., based on a number of characteristics, scoring the received video feeds, such as via a suitably configured AI module of the system, and then based on the score of each video feed, the highest scoring video content can be prioritized with respect to the input channel to which the content is directed, so as to ensure the content is prioritized into an accessible and available input channel. In this manner, the most salient content can be prioritized for receipt, commenting, coaching, and feedback, and can then be further prioritized with respect to the output channel to which it is to be dedicated.

Consequently, distribution of these images or other content may be prioritized and transmitted out, via a selected and available output channel, to one or more recipient devices for viewing thereby. In such an instance, the video selected to be distributed or otherwise broadcast may be based on an AI determined relevancy score, or by a user evaluation score, such as based on one or more metrics and/or parameters. Hence, in such an instance, regardless of whether the event has an official image capturing system, the platform may be configured for receiving both official and non-official video feeds, and selecting which one of the feeds to select for engagement and/or editing, such as for commenting, coaching, and or providing instructions, therefore, and then distribution and/or broadcasting to various other of the recipient devices of the system.

Accordingly, this document describes a comprehensive interactive system and platform for collecting data, such as inputs from one or more system users, collating that data to generate content, as well as for formulating, formatting, and broadcasting communications pertaining thereto. The content may be generated by a variety of mechanisms, in a multiplicity of forms and formats, and may be related to a number of different activities. For instance, the content to be generated may pertain to a performance of an activity, the activity may be an athletic event or a game of chance, such as a betting game, and the format in which the content is collected may be one or more inputs.

The inputs may be user entries evaluating the performance, or may be one or more audio and/or images, such as a video of a performance itself. In various instances, the platform is configured for allowing the content to be annotated with comments, such as from a commentator, coach, or other evaluator. For instance, input content can be directed to a content studio platform, whereby commenting, coaching, and instruction data can be provided, e.g., annotated into the content. Particularly, the comments to be added may be directed to enhancing an actor's performance of the activity, such as where the actor is a competitor in an athletic event, or may be commentary on the state of play, such as where the commentary is provided by a commentator, which commentary may be directed to a probability of one or more outcomes, such as generated by an evaluation being performed real time by a suitably configured AI or other user of the system. In particular instances, the captured and/or annotated content can be broadcast directly, through one or more channels, such as directly to one or more recipient device, e.g., for immediate viewing, or over the Internet for viewing at a graphical user interface of a client computing device, such as by activating a transmitted link, e.g., via a URL.

In particular instances, the content studio is configured as a relay transmitter for directly receiving content, e.g., video content, formatting the content for distribution, and then directing the content to a suitable output, such as via an active link, whereby the number of outputs can be equal to the amount of recipients. In such instances, the content to be transmitted may be provided as a link, for instance, by clicking the link the number of recipients can then be presented the video content for viewing. In a manner such as this, an event can be distributed directly to recipients for viewing, without having to be broadcast.

Particularly, the system would be suitable for filming a performance, such as at a local event forum, concert hall, or gym, and distributing the content directly from the filming device, such as a smart phone, and then distributing the content directly to recipient devices, such as via an accessible URL, whereby activating the link allows the recipient to receive the video stream. In one particular embodiment, the event may be a performance, such as a musical performance, e.g., a concert, whereby the venue is a local music hall, and the system user is videoing the performance and providing a link by which the concert can be seen by interacting with the link, without the need for broadcasting. Such performances can include musical, acting, theatrical, gymnastics, workouts, children's sporting event performances, and the like. In this manner, a local venue owner can reach a multiplicity of fans, without need of setting a costly and time consuming broadcasting infrastructure.

In one embodiment, the system may include a client application program, which in various instances, may be configured so as to be downloadable to a mobile device. The program may generate a graphical user interface into which one or more user inputs may be entered. The user inputs may include evaluations pertaining to the user's opinion of how well an actor performed, or is performing, an activity in an event. Such inputs may be made in a variety of formats, such as in the form of a score, e.g., an alpha-numeric input, a statement or series of statements, an instruction, coaching instructions, a directive, a direct message, a strategy, and the like. In various instances, the input may itself be a recording of the performance, such as a video, and in particular instances, the video may be live streamed, and/or presented at the graphical user interface, such as for viewing and/or commenting thereon, such as via the content studio acting as an intermediary between an input, e.g., from a content generator, and an output, e.g., to a content consumer.

Accordingly, the platform may be configured for performing a variety of tasks for the purpose of enhancing the engagement of a spectator in viewing a performance, an athletic event, or other activity, e.g., a gamming event, and/or for providing feedback, opinions, or direct messaging with respect thereto. In various instances, the platform may include an evaluation and/or scoring module, for commenting on and/or scoring an activity of a participant in the event, and in other instances, the platform may include an evaluation and/or coaching module, for providing commentary or instruction to the performer with respect to their performance in the event. Additionally, in certain instances, the platform may be configured for distributing without broadcasting and/or with broadcasting one or more audio and/or images captured with respect to the performances of actors, e.g., competitors, in the event.

For example, in some embodiments, the platform may include a content studio. The content studio may be configured for retrieving, or otherwise receiving, the input, such as of the one or more captured images, e.g., from a video stream, of the event. The content studio may be configured for presenting a graphical user interface (GUI) at a display of a client computing device by which GUI a platform user may interact with one or more of the inputted and retrieved images, such as for commenting thereon. In various instances, the content studio may be engaged with by a user via a client application running on a computing device of the user. In such an instance, the GUI may provide a number of controls or tools for allowing a viewer to engage with and/or comment on the performances of various actors in an event that is captured by the one or more images, such as with respect to providing feedback with respect thereto.

In particular instances, the GUI may be configured to provide one or more interactive view panels that are configured to display the content, e.g., video content, retrieved or otherwise received by the system, and which may allow for engagement with the input and/or stored content. For instance, in various embodiments, the system may include a database whereby a number of received inputs, such as audio and videos, may be stored, and presented to a user of the platform for selection for engagement therewith. Particularly, a user may be presented with a view panel by which a variety of content, video, or other images or content may be provided to a user for selection, such as in a menu of available content to be engaged therewith. Likewise, another view panel may be presented for presenting the selected content, e.g., video content, for viewing and engagement therewith. Hence, in certain embodiments, a plurality of view panels may be provided, such as where a plurality of videos may be selected for viewing, e.g., simultaneously, such as where the two view panels are provided side by side horizontally one on top of the other or vertically one beside the other, whereby the user can comment and engage with content in both panels, simultaneously or individually.

As indicated, the various inputs into the content studio may be provided, e.g., transmitted, to the system in a variety of different manners, such as by transmission from one or more content capturing devices, e.g., an image capturing device, associated with the system. The image capturing device may be any device capable of capturing images of a participant in an event, such as a mobile computing device having downloaded the application, or a camera, e.g., video camera, that is associated with the system such as over a wired or wireless communications network. In any of these instances, the captured images, or other content, may be transmitted to the system server, the images analyzed, tagged, categorized, and/or stored by the database of the system.

Hence, in various instances, the video content to be presented to the content studio for selection and engagement by a user of the platform may be captured by a camera on the mobile device of one or more user's or one or more separate video cameras that are in communication with the system. Accordingly, in certain instances, a plurality of cameras, e.g., video cameras, may be configured for capturing content and providing the same to the system, which in particular instances, may be transmitted to the system in streaming fashion, such as in a live feed. The same holds true for audio and other content collection. Consequently, the content studio of the platform may include a plurality of control devices, such as a streaming and/or an output control to respectively control streaming and/or output of the video content from the content studio. One or more tools, such as provided in a tools menu, may also be presented to the user.

Particularly, in various embodiments, a "tools" menu may be presented whereby one or more tools is made accessible to the system user so as to allow the user to interact with one or more of the captured content, e.g., images, such as one or more video clips or sequence of photos, e.g., digital photos, such as to allow the user to engage with and/or comment on the content of the image presentation. More particularly, the interactive display of the graphical user interface of the content studio may present a filmed clip, e.g., of a performer performing an activity in an event, and further present a tools menu, whereby the tools menu provides a number of tools by which the user can use to interact with, e.g., comment on, a performance of the activity by the performer in the event.

Hence, a palette of editing tools may be provided, such as where each of the editing tools may be configured to enable editing by a user of the video content received by the content studio and displayed in at least one of the one or more interactive view panels. For instance, in certain instances, the tools menu may include a pen or marker feature, an eraser, a paint brush feature, a key board or microphone or voice recording feature, a letter and/or font feature, an underline, italicize, or bold feature, a microphone, a flag, a zoom in or out feature, a systems preference feature, a discard feature, and the like. In particular instances, the palette of editing tools may include one or more graphical control buttons to enable one or more of annotating an audio or image or video file, merging two audio or image or video files into a merged audio/image/video, displaying two or more images/video files simultaneously, and displaying two or more image/video files synchronously.

The platform may further be configured for outputting, e.g., transmitting, distributing, and/or in some instances broadcasting, the captured content to one or more recipient devices. For instance, the transmission may be prior to or after one or more users have engaged with and/or commented on the received content, e.g., images, and may further be after the system has determined one or more output channels by which to transmit the content. Hence, the platform may have one or more inputs and one or more outputs, where each of the one or more inputs may be configured for receiving content data, e.g., video content, from an image capturing device of the system and/or for providing the same to the content studio. Likewise, each of the one or more outputs of the platform may be associated with a uniform resource locator (URL) that can be rendered in a website of a recipient computing system, such as a client computing device, that is configured for outputting and/pr displaying the video content in the rendered URL, such as at one or more display panels. In various instances, the system may include a mapping engine so as to map input content to one or more output channels.

Accordingly, in various embodiments, the platform may have a mapping function that is configured to map each of the one or more inputs to at least one of the one or more outputs. In various instances, the mapping function may be configured to perform a mapping operation based at least in part on a source of the video content and/or based on a destination of the video content, such as where the destination includes the recipient computing system. In certain instances, the identity and/or location of the image capturing devices may also be transmitted or otherwise retrieved and/or mapped by the system. This may be done in a number of different manners, such as using cellular tower triangulation, GPS location, a geolocator, and/or through radio-frequency identification (RFID) determination, e.g., using the RFID of the phone and/or image capturing device.

Particularly, the location of the phone and/or imaging device may be transmitted to and mapped by the system via the device's endogenous technology, which may utilize electromagnetic fields to detect and track tags attached to objects. Likewise, a connection framework may be provided, such as where the framework is configured for establishing a connection between one of the one or more interactive view panels of the content studio and a selected input or output of the platform, such as where the connection framework may be based on an application programming interface (API) call from the content studio to the system platform and/or to an output or distribution module, e.g., upon activation of the content studio to display or transmit the video content selected by a user for engagement and/or transmission.

In certain embodiments, the computer-implemented platform may include a management hub, such as where the management hub is configured to receive inputs representing various different content particulars, event parameters, and/or evaluation metrics. The event details and/or particulars may include one or more of a time, a duration, a location, an identification of one or more participants of the event, a schedule of participation of the one or more participants, a description of activities to be performed, statistics pertaining to performance, past predictions as well as future predictions, and the like.

Such data may be entered into the system by a system user, or may be retrieved by one or more system components, such as via a suitably configured data collector, scheduler, web-crawler, location determining device, e.g., GPS, facial or pattern recognition module, and the like. Such data may be identified and collected from one or more social media platforms, such as FACEBOOK®, TWITTER®, INSTAGRAM®, TIKTOK®, and the like. In such an instance, the content studio may be configured to use the retrieved data for a number of reasons such as to identify and/or tag one or more of the participants performing in the event, one or more commentators or judges commenting on the event, one or more coaches, and the like.

Such identification may be determined by the system based on one or more of the retrieved time, duration, location, identification, and schedule of activity and/or participation of the one or more participants in or viewers of the event. The content can further be augmented by one or more content generators or viewers, which augmentation may be supplied to one or more social media platforms, whereby the poster may comment on the event and/or its performers, such as by posting their evaluations online, which evaluations may serve as one or more metrics by which to evaluate the content and its import.

In particular embodiments, the platform may further be configured as a content distribution and/or broadcasting and fan input system. The platform may include a backend server in communication with the content distribution module and one or more customer computing systems, such as where the backend server is configured for receiving, e.g., from the one or more customer computing systems, user feedback associated with the selected video content. In various instances, the receiving of user feedback may be limited to feedback received within a predetermined time period and/or may include content collected from one or more online databases, such as a social media platform. This data may be employed for removing a bias from user feedback. In a particular instance, the user feedback may include a digital signal representing a quantitative and/or qualitative evaluation of the selected image and/or video content.

In another aspect, a computer-implemented method may be provided. For example, the method may include receiving, at the management hub of a computing device of the system, an input, such as an image input, a system user input, a spectator input, and the like. Particularly, the image input may be a video image of a competitor in an event, and the spectator input may be a characterization of the spectator's opinion as to the performance of the competitor in the event. For instance, in various embodiments, the characterization of the spectator's opinion may be an input evaluating the competitors performance in the event, and in some instances, the evaluation of the activity may be an input in the form of a score or evaluation that is posted or transmitted to the system from a user, e.g., a spectator, engaging with the system via an application running on a mobile computing device, such as a mobile phone.

In such an instance, the spectator's evaluation may be transmitted to the system along with one or more additional data, such as including one or more of a mobile device identifier (ID), a user ID, user information, location data of the device, and the like. Particularly, the application running on the client computing device of the spectator, or an IP address or other geotag operating on a device of a user of the content studio, such as a commentator or coach, may be configured to display an input for receiving commentary, evaluations, instructions, or a score of the activity from the spectator. Accordingly, the client application may be configured for communicating the user's input to the server system, e.g., via a direct link, a URL link, or via a communication network. In various instances, the client application may be configured for capturing one or more images and/or taking one or more videos of the participant in the event, which images and/or videos may be communicated to the content studio, such as via the system server, such as via the application, and/or may be directly distributed, via a URL link, for direct viewing.

Hence, a server of the system may be configured for receiving the spectator evaluation, images, and/or videos, and may further be configured for receiving other user data, such as data associated with the evaluation and/or image data, e.g., meta data detailing the event, participants, parameters of the event and its participants, and the like. For example, one or more identity and/or location data may be collected and transmitted via the application. Particularly, the data may include a mobile device ID, a user ID, other user information, location data, and the like, and may be associated with an entered user evaluation, and/or image or video captured on the spectator's device.

Once the evaluations, e.g., instructions, scores, comments, posts, images, and/or videos have been received by the system server, the inputted data may be evaluated by the system and/or a user of the system, such as at a generated dashboard workspace presented at a display of a client computing device of the system. For instance, in various instances, the method may include generating and/or displaying a graphical user interface of a content studio, where the content studio includes a plurality interactive view panels, such as a panel displaying a menu of the inputted evaluations, images, and/or videos available to be selected and viewed by a system user, and one or more panels providing a work space by which the user can engage with one or more selected image and/or video files. In certain instances, the system may be configured for performing analytics on the received data, such as for identifying a competitor captured by the images and videos or for assessing the entered evaluations, such as for bias, e.g., bias associated with the spectator. In certain instances, the system and its collected content may be employed, so as to determine bias, and where bias is determined the entered scores may be adjusted so as to compensate for the determined bias.

Accordingly, in particular instances, the collected content, e.g., image and/or video content, may be an image pertaining to an athletic competition, a theatrical performance, or a gaming event, having a number of competitors, performers, gamblers, performing therein, which images and video may be received by the content studio from one or more video cameras connected with the content studio via a communication network, and may be stored within a designated database of the system and/or provided to a menu of images for selection by a user of the system, such as by a coach. One or more additional data may also be transmitted to the system, such as in correspondence with the transmitted collected, e.g., video, content. For example, the data, e.g., metadata, may include one or more details pertaining to the event, a participant in the event, an event sponsor, spectator of the event, and/or other system user. Particularly, the details may include a variety of data such as one or more of a time, a duration, a location, an identification of one or more participants of the event, a schedule of participation of the one or more participants of the event, a time and location and identification of an input device of an observer or camera person, and the like.

In particular embodiments, one or more of the camera man, participants, other observer, and/or images containing the same may be tagged. The tagging may be performed autonomously by the system, such as via image or pattern recognition or the like, and in other instances the tagging may be performed by a user of the content studio. In certain embodiments, the image and/or video content, and/or a participant captured thereby, may be identified and/or tagged, such as according to one or more of the time, the duration, the location, the identification of one or more participants of the event, and the schedule of participation of the one or more participants of the event. In a manner such as this, various of the participants of the activities in the event may be captured by one or more images, may be identified, and may be tagged by the system.

In various embodiments, a method for engaging the system may be provided, such as where the method may include using one or more of the controls of the content studio so as to receive and/or the direct the input, e.g., streaming, to engage content via the content studio, and/or to direct and control the output of the image/video content to and from the content studio. Particularly, in various embodiments, the image and/or video content may be provided to a distribution platform, such as for distribution and/or broadcasting thereby. For instance, the distribution platform may include one or more inputs and/or one or more outputs, such as where each of the one or more outputs is configured for transmitting the captured content, e.g., image and/or video and/or other associate data to a recipient device, such as by associating the same with a uniform resource locator (URL) that can be rendered in a website of the client computing device. In this manner the system may be configured for transmitting and/or displaying the selected video content, e.g., in the rendered URL. In various instances, the content can be posted to a website, and/or may be broadcast.

Hence, the method may further include delivering, to at least one input of the content distribution platform, a selected content, audio, image and/or video from the content studio, e.g., via an application programming interface (API) call. The audio, image, and/or video data, which may then be transmitted from the content distribution platform to a client computing device, such as for display thereby. In various instances, the system may include a mapping module, and, therefore, may additionally include mapping the content, via a distribution network, to the one or more inputs, of the distribution platform, and further to at least one of the one or more outputs.

Hence, the method may include outputting, e.g., by the content distribution network, the video content selected by the user, and in certain instances, the outputting, e.g., distributing and/or broadcasting, may be based on at least one tag or associated metadata associated with or selected by a user of the client computing system. In certain instances, the mapping module may be configured to map, and a method of use of the system may include mapping, each of the one or more inputs to at least one of the one or more outputs, such as based at least in part on a source of the video content, an identity of the content generator or performers thereof, and/or may be based on a destination of the video content, the destination comprising the customer computing system.

Accordingly, as can be seen as can be seen with respect to FIG. 1, each of the various components of the system may be interconnected, such as via a network interface, for instance, via a cloud-based interface and/or an application running on a mobile device. In a manner such as this, the system may be configured for capturing and/or distributing and/or displaying content, e.g., a video of a performer or participant in an event, whereby the video has been selected so as to be the most salient to the viewers, most in need of instructions or coaching, such as with respect to one or more characteristics thereof. These characteristics may include one or more parameters, such as clarity, actionality, viewability, exemplary features, maneuvers and/or routines performed, correspondence to one or more ideal performances, or metrics of performance, such as posted comments evaluating a performance, such as along one or more parameters, and the like.

In various embodiments, the characteristics to be used in determining which videos to input and/or distribute may be selected by the system, such as by a suitably configured AI module thereof, and/or may be voted upon by the participants or observers of the event, and/or one or more coaches or commentators. In such instances, identifiable characteristics may then be used to score the incoming images and/or videos, and select one or more feeds that best represents the collective's desired viewing characteristics, which videos may then be distributed and/or broadcast to the various different users of the system.

Likewise, prior to input or output, the content may be evaluated by the system or one or more of the system users with regard to one or more parameters of an event or participant thereof, as well as one or more metrics, such as determined by audience or participant evaluations, such as scores, likes, dislikes, forwards, upvotes, down votes, plus or minus ones, number of times commented on, positive or negative comment indicators, and the like. Hence, the system may be configured for not only providing a scoring and/or commenting and posting platform by which the viewers, e.g., users of the system, may engage with, e.g., score or otherwise evaluate, the performance of the various different competitors in the event, but may also be configured for allowing the users to evaluate, score, or otherwise comment on or engage the various different video feeds, so as to select the best images to be distributed, broadcast, and viewed.

Accordingly, in various instances, the system may be configured for collecting data and content, such as image, e.g., video, content. As explained herein below, the system may include a database, such as a structured database, that includes one or more libraries of content, such as content input, collected, or otherwise be retrieved by the system components. As indicated, the content may be audio and image and video content that can be stored in a structured library that can then be presented for engagement as a menu of selectable items, such as via one or more display panels, by a user of the content studio of the system, e.g., an evaluator or coach or commentator of the content and/or the performer.

In such an instance, a user of the system may engage a computing device of the system to access the content studio, perform a search of a database, so as to access stored content within a categorized library. Once accessed, a dashboard interface may be generated and presented at a display screen of the computing device, or HUD, and through the dashboard interface, the selected content can be presented for viewing and/or engagement. Accordingly, in various embodiments, the content studio may be configured for generating a dashboard workspace, including one or more display panels, which may allow a user of the system to engage with collected content, or simply to direct and map inputs to outputs, e.g., such as in a live streaming format, in one or more manners discussed herein. Further, as can be seen with respect to FIG. 1, the system may include one or more analytics modules, such as for running one or more analysis on collected data, from the results of which analyses one or more insights may be determined.

Accordingly, with respect to FIG. 1, in one aspect provided herein is a system 1 for editing or otherwise engaging with content received by a system user. For instance, in various embodiments, a content studio 10 may be provided, such as where the content studio 10 presents a content library 12 exhibiting therein a selection of content 12a, 12b, and 12c, such as image and/or video content that can be selected for engagement by a user of the content studio 10. Specifically, the content library 12 may be coupled with a database 14 of the system, which database 14 stores collected or otherwise received content, such as in one or more structured files. In particular embodiments, the system may include a file manager 13 that is configured for categorizing received content, structuring the database 14, and for providing files, e.g., stored content, to the content library 12 in response to a call from the content library 12. More specifically, in response to a call initiated by a user of the content studio 10 requesting one or more content items having an identified classification or falling within a defined category. The content items, in this present instance video content 12a, 12b, 12c, may be collected or otherwise received by the content studio 10 from one or more image capturing devices 20, e.g., video cameras, in communication with the content studio 10 via a communications network 15.

For example, the image capturing device 20 may be an official video camera 20 *a* filming the event, or may be an endogenous video camera 20 *b* of a spectator's mobile device 100, or other image capturing device 20 *c*. Likewise, the content studio 10 may present a work space 30 for engaging with the selected content 12a. Particularly, the work space 30 may present one or more interactive view panels that are configured to display the selected video content 12b. More particularly, the work space 30 may include a first view panel 30 *a* and a second view panel 30 *b*, where each view panel provides a working interface for allowing a user to engage with content 12a from each view panel independently or collectively, together. In a manner such as this, a user of the content studio 10 may select one or more content items 12a, e.g., videos 12b, to engage with in one or more view panels, such as for the purposes of editing and/or commenting on the selected content. Hence, the view panels may be both active and interactive.

Likewise, the selected content 12a may be transmitted, in this instance broadcast, either prior to or after engagement by the user with the content 12a, to one or more recipient client computing devices 100, such as for viewing thereby. In certain instances, the transmission may be configured so as to be streamed. In this manner, the system 1 allows users to capture and transmit content 12a from one user to many, e.g., any number of users, directly, without the intervention of a formal broadcasting system. The content studio 10, therefore may further include at least one of a streaming control and/or an output control to respectively control streaming and/or output of the video content 12b from the content studio 10.

In this regard, the system 1 may include, and the content studio 10 may be coupled with, a distribution and/or broadcasting platform 50. For instance, the content studio 10 may be coupled to a broadcasting platform 50 wherein the broadcasting platform may have one or more inputs 51, where each of the one or more inputs may be configured for receiving selected video content 12*b* from the content studio 10. The broadcasting platform 50 may additionally include one or more outputs 52, such as where each of the one or more outputs may have a uniform resource locator (URL) that can be rendered in a website of a recipient client computing device 100, such as is configured for displaying the selected video content 12*b* as the URL is rendered.

For effectuating these purposes, the broadcasting platform 50 may further include a mapping functionality that is configured to map each of the one or more inputs 51 to at least one of the one or more outputs 52. Likewise, the broadcasting platform 50 may include a connection framework 53 that is configured for establishing a connection between one of the one or more interactive view panels 30 of the content studio 10 and a selected input 51 of the one or more inputs of the broadcasting platform 50 based on an application programming interface (API) call from the content studio 10 to the broadcasting platform 50, such as upon activation of the content studio 10 so as to display the video content 12 selected by the user.

In particular instances, the various components of the system 1 may be configured for communicating one with the other via a wired or wireless communication protocol. For instance, the components of the system 1 may be configured for communicating with various other system components via an internet network connection, such as where the broadcasting platform 50 communicates with a client computing device 100 of another system user so as to transmit a URL to the client computing device 100 such that by clicking on the link the selected video 12*b* may be rendered and viewed. So being the system 1 may be configured for enabling one to many broadcasting.

In various instances, the content studio 10 may include a management hub that is configured to receive one or more other inputs in addition to the content 12, e.g., image content 12*b*, such as input representing the details of an event. In such an instance, the details may include one or more of a time, a duration, a location, an identification of one or more participants of the event, and a schedule of participation of one or more participants in the event. Accordingly, in this instance, the content studio 10 may be configured to display content 12*a*, e.g., video content 12*c*, from the event, which content can be supplied to one or more of the interactive view panels 30*a* and 30*b*. In particular instances, the video content 12*c*, e.g., the identity of one or more performers in the event, may be identified and tagged such as according to one or more of the received time, duration, location, identification, and schedule of participation data received by the system. Hence, in certain instances, along with the image content 12*b*, event and/or participation content can also be transmitted to the system 1, which event and/or characterization content can be used to identify and/or characterize the video content 12*c*.

Accordingly, in view of the above, what is needed is a holistic platform that provides for the easy and intuitive capturing, transference, e.g., input and output, engagement with, and the distribution of content, from its capture to its distribution, in a manner that allows an entire suite of tools that are readily accessible and controllable by the content generator or others. The technologies presented herein meet these and other such needs. Particularly, in various aspects, provided herein is an interactive, crowd-source content transference platform, such as for judging, commenting on, and/or coaching an activity, e.g., a sporting event or other performance, by one or more participants of an event having the activity.

The platform may be implemented on a computing device, for instance, one or more of a remote server, a desktop computer, a tablet computer, mobile phone, personal digital assistant, smart watch or ring, and the like. Specifically, in various embodiments, the platform may be implemented by a content studio that can be accessed directly or via a client application program, such as a downloadable application or other executable, which may include instructions that direct the actions of one or more processing engines of the computing device on which it is implemented, such as in the performance of one or more tasks, for instance, the inputting, judging, scoring, commenting on, coaching, evaluating, distributing, and/or like activities of an observer observing an activity engaged in by a performer of an event. More particularly, the computing device may include a processing engine that is configured for generating a graphical user interface into which the observer's directions, judging, commenting, coaching, and/or other activities regarding describing one or more characteristics of one or more activities by a performer in the event may be entered.

For instance, in one instance, the graphical user interface may include a plurality of different interfaces, or panels, e.g., display panels, which may include one or more drop down menus, presentation screens, and/or interactive performance displays, such as an interactive display screen that is configured for allowing an observer or viewer, such as a coach, to view and comment on one or more activities of one or more performers in one or more events, such as at a display of the computing device. Additionally, in various embodiments, a "tools" menu may be presented whereby one or more tools is made accessible to the viewer so as to allow the user to interact with a presentation, such as a video clip or sequence of photos, e.g., digital photos, such as to allow the viewer to comment on the content of the presentation. Particularly, the interactive display of the graphical user interface may present a filmed clip, e.g., of a performer performing an activity in an event, and further present a tools menu, whereby the tools menu provides a number of tools by which the viewer can use to interact with, e.g., comment on, a performance of the activity by the performer in the event.

For example, in one embodiment, the content studio is configured for providing one or more interactive view panels that are configured to display video content selected by a user of the studio. The video content may be received by the content studio from one or more inputs, such as a video camera in communication with the content studio, e.g., by one or more content providers. In such an instance, the content studio may further include one or more tool sets and at least one of a streaming control and/or an output control to respectively control streaming and/or output of the video content from the content studio.

In particular instances, the content studio may have one or more interactive view panels in a graphical user interface of a display. In such an instance, the content studio may be configured to identify salient data of various inputs, and to select a number of videos to be displayed, e.g., video content, from the event that may be supplied to each of the one or more interactive view panels. A user of the system, or the system itself, may then use the tools of the content studio to evaluate, categorize, and tag the video content, such as with regard to one or more of the time, the duration, the location, the identification of one or more participants of the event, one or more parameters and/or one or more metrics of fan engagement, and the schedule of participation of the one or more participants of the event. In such an instance, the video content being provided to the content studio by one or more video cameras connected with the content studio via a communication network, such as via one or more determined inputs, the content studio may further include at least one of a streaming control and/or an output control to respectively control streaming and/or output of the video content from the content studio.

As indicated, the content studio may further include a palette of editing tools, for enabling editing by the user of the video content received by the content studio, which may be displayed in at least one of the one or more interactive view panels. For instance, the palette of editing tools may include one or more graphical control buttons to enable one or more of annotating a video file, merging two video files into a merged video, displaying two or more video files simultaneously, and displaying two or more video files synchronously. In certain instances, the tools menu may include a pen or marker feature, such as for annotating selected content, and an eraser feature for erasing annotations. A variety of other tools may also be provided such as a paint brush feature, e.g., for making colorful swaths, a letter and/or font feature, an underline, italicize, or bold feature, a microphone, a flag, a zoom in or out feature, a systems preference feature, a discard feature, and the like. In various instances, a repository may be provided for storing the annotated video, such as where the video may be stored based on an associated one or more identifiers and/or tags. Additionally, at a later time, the one or more videos may be configured for being distributed from the content studio, such as based on a user selection, to one or more output channels.

Consequently, the graphical user interface of the content studio may allow an observer or viewer, such as a coach, to view a menu of content and to select a video, e.g., a video clip, for review and commenting on by the viewer. In such an instance, one or more videos may be selected from a selection of videos presented to a user of the computing device, such as at an electronic display thereof. The selection of videos may be collected from one or more video collection systems that are in communication with the electronic display, and which, upon selection may be formatted, e.g., by a formatter of the system, for display in the interactive graphical user interface and/or for transmission via one or more outputs Particularly, the selection of videos may be represented as a thumbnail image in a video selection region of a panel, e.g., a menu screen, of the interactive graphical user interface. In such an instance, an individual may select one or more videos to review, which videos may then be presented in one or more additional presentation screens. In various embodiments, the video selection may be built from a number of different videos having a common theme amongst them, such as where one or more of the selection of videos may be commented on and/or may be tagged by the content studio of the computing device with one or more classifications and/or other identifier tags.

In various instances, a database, such as a structured database may be coupled to the content studio. The database may be configured for storing one or more video clips received at one or more of the input channels, which clips may be flagged by the system, or selected for review by a user of the system, and/or whereby such storage is based on one or more tags or classifications with respect thereto. In particular instances, the clips to be selected for presentation, may be input into the content studio from a variety of sources, captured at a variety of different times, from a variety of different activities, in a number of different events from a number of different dates. Once the clips have been received, they may be parsed by the system, content therein may be identified, categorized, and/or classified, and the content can be evaluated and scored, e.g., by the system or a user thereof, and then the content may be stored in the structured database, e.g., based on classification and/or category, for later review, commenting, editing, and/or evaluating.

In such an instance, one or more of the display panels of the graphical user interface may present a menu of a number of different clips from which the viewer, e.g., a commentator, coach, or other user may select one or more content items, e.g., videos, for interaction therewith. Once one or more videos have been selected, the GUI may then display the selected clip(s) at an engagement screen interface wherein the presented videos can then be commented on, or otherwise interacted with, via one or more available tools interfaces. For example, where the clip is a video clip that may be presented at a display screen interface of the GUI, a view panel showing the performance of a participator in an event may be displayed, and a control panel for controlling the displaying of the video may also be presented. Using the control panel, the user can control the playing of the video, and using the engagement tools, the user can interact with the contents of the video, such as to annotate the video with respect thereto. Specifically, the control panel may display the time period during which the performance occurs, and may include one or more toggles so as to allow a viewer to toggle through the performance, moving forwards and backwards and/or stopping or pausing, as desired.

In this manner, the viewer can control the playing of the clip, and can then interact with the clip so as to provide commentary, instructions, and/or feedback, such as to the performer. For instance, the user may view the performance, e.g., of a participant, and use the tool bar to select a tool by which to interact with the clip. For example, a pen or pencil tool or keyboard may be used to allow drawing on the display interface, a type tool can be used for the typing of comments, e.g., by the viewing coach, and a highlight or graphics feature may be used to highlight or otherwise demarcate a feature about which to be discussed. Particularly, in various instances, one or more graphical tools may be generated by the interactive graphical user interface, where each of the one or more graphical tools may be configured to receive an input from the user for annotating the one or more video clips of the performance of the activity presented by the interactive graphical user interface so as to generate an annotated video based on the input from the user.

In various instances, the display screen can actually be a split display screen showing two interactive panels so as to allow one clip from one performer to be viewed, commented on, and/or compared on one screen part, against a performance by another performer being displayed on another screen part. In this manner, the performance of one performer can be easily compared against the performance of another user. In particular instances, the performances to be displayed and compared may be from the same performer, however, at different times and/or at different events or heats. In such instances, a plurality of screens may be provided, and a corresponding plurality of control interfaces may be presented. In this manner, the flow and/or control of one performance may be viewed and/or controlled independently of another, or the plurality of performance may be configured such that they may be compared along the same timing.

In various embodiments, the graphical user interface may be presented on a multiplicity of different computing devices, such as at a first device being employed by a viewer, e.g., a coach, to comment on the performance of a performer in an event, and may further be presented at a second device being employed by a viewer, such as a performer, who is interested in receiving input on their performance, such as by the first viewer, e.g., coach. In certain instances, the content being captured may be real-time and provided to a multiplicity of users simultaneously or sequentially. In this manner, the interactive, crowd-source communication platform may be employed in a method so as to allow a performer or other user to view a performance, such as at a GUI presented on a first computing device, at a first time, and at the same or a later time, the performance may be viewed by a second viewer, where the second viewer may be a coach or other commenter or fan who views the event and takes one or more actions with respect thereto, such as by engaging the tools menu so as to interact with the displayed clip, such as to demarcate actions that can be highlighted so as to give feedback to the performer with respect to their performance, or for posting on an online website, such as a social media platform, e.g., with associated commentary, such as evaluative commenting with respect thereto.

Consequently, in particular embodiments, as described herein below, a system for providing comments or coaching on a performance of a performer in an event is provided, whereby the system includes a plurality of computing devices. The system may include a plurality of client application programs distributed to a corresponding plurality of computing devices, e.g., mobile devices, having an interactive display, such as where the content is transmitted through one or more output channels to each client application program, which is configured to present a graphical user interface, e.g., at an interactive display, of the computing device. Specifically, the graphical user interface may be presented at a display of a first and second computing device whereby the display of the presentation is configured to correspond between the two different devices in such a manner that an interaction performed at one display is displayed at the second display, such as substantially contemporaneously so as to thereby allow for the distributed and real-time viewing of the performance of a performer of the event, such as via corresponding client applications running on the respective first and second computing devices, which our coupled to respective outputs of the content studio.

In view of the above, in one aspect, the present disclosure is directed to devices, systems, and the methods of using the same for generating, engaging with, and distributing content, such as media rich, video graphic content. Particularly, in one aspect, provided herein is a computing system for evaluating a performance of an activity being performed by a competitor in a competitive or theatrical event. For instance, in various embodiments, the system may include a computing device, e.g., configured as a studio system server, for generating an electronic display that is adapted to provide an interactive graphical user interface to a user of the computing device. In various instances, the graphical user interface may be configured for generating one or more presentation screens, within which screens the collected content can be viewed and one or more actions may be taken, such as for searching for content for display, for displaying selected content for engagement, and for presenting tools and controls by which to engage with the selected content.

Hence, provided herein is a studio system sever that is configured for generating the aforementioned interactive graphical user interface. The system may include or otherwise be associated with a repository for storing one or more content, e.g., videos or commentary, of a performer performing an activity. The content may each be stored based on one or more identifiers by which they have been tagged, such as by one or more activity-related identifiers, event particulars, or fan engagement metrics. In particular embodiments, the server may include one or more of a library builder, a presentation builder, e.g., of a presentation module, a tool module, a compiler, a formatter, and/or a distribution engine.

For instance, in one embodiment, the server includes a library builder that generates and/or otherwise presents a search menu for accessing and/or retrieving content from a repository. Particularly, as indicated, the server may be coupled with another computing device, such as via a network connection, and may be configured for generating a graphical user interface at a display screen of the client computing device. The GUI, in turn, may be configured for generating one or more engagement panels for presentation at the display screen, whereby a user of the computing device may interact with the engagement panels so as to search for content, select content to be engaged with, view the content, and/or engage with the selected content, and once completed, the user may select one or more modes of distribution and one or more channels by which to distribute the end product.

For example, a first engagement panel may be configured as a search screen, whereby the user can be presented one or more search menus by which to enter one or more searches for content, such as based on one or more activity-related identifiers, and in response to a search query, the system server may identify a selection of one or more videos related to the search query. In response to the search query, the server may access the repository, identify search related content, and then retrieve the same for the building of a structured library, such as a structured library. In various embodiments, the structured library may present a representation of a selection of identified videos for display in the library panel, such as where each of the selection of the videos is available for selection by receiving an input at the interactive graphical user interface.

Further, a presentation module may also be provided, such as where the presentation module is configured for generating one or more other panels, such as one or more interactive presentation panels, such as in the interactive graphical user interface. Accordingly, once a search result has been returned, and a selection made, the selected video may be retrieved from the structured library for presentation in one or more of the interactive presentation panels. Likewise, a tool module may be provided, such as where the tools menu presents one or more graphical tools, such as in a tools panel in the interactive graphical user interface. In various instances, each of the graphical tools may be configured to receive an input for controlling the presentation of the selected video. In a particular instance, at least one of the graphical tools may be adapted for annotating the selected video being presented at the interactive presentation panel. Hence, in various embodiments, a compiler may be provided such as for receiving the user annotations and other engagements to the selected content, e.g., audio or video, and for generating an annotated video, such as for distribution and/or storage of the video, e.g., in the repository, such as in accordance with one or more activity-related identifiers.

In a further aspect, provided herein is a content studio system that includes one or more server computers, such as where the studio system is configured for receiving digital audio or image content, such as via a network. In various embodiments, the server may be configured for individually tagging the collected digital media content, such as with one or more tags, e.g., of an event identifier, a participant identifier, a viewer identifier, a metric, a parameter, and the like. The studio system may further include a memory for storing the tagged digital media content, such as in a structured library. Furthermore, the studio system server may further be configured to receive a search request for accessing the structured library and retrieving the search results.

For instance, in response to a request from a client computing device, the server may access one or more libraries so as to identify and retrieve the digital media, e.g., image content, such as based on a requested identifier, such as an event identifier, a participant identifier, a viewer identifier, a parameter identifier, a metric identifier, and the like. The identified content may then be presented, via the network, to the client computing device for display thereby. In such an instance, the server system may be configured for receiving feedback data regarding the content presented at the GUI of the client computing device, such as where the feedback data represents user interactive data entered at a display of the computing device using one or more graphical tools that are presented so as to annotate the digital image content. Accordingly, in particular embodiments, the user interactive feedback may include annotations to the selected portions of the digital image content, which content can then be stored along with the feedback data and annotations, such as in the memory, and in accordance with one or more identifiers.

Accordingly, in an additional aspect, provided herein is a studio system that includes one or more client computing devices that are configured for communicating with a studio system server computer, e.g., via a network interface. In various embodiments, the one or more client computing devices are configured for receiving selected portions of digital image content from a structured library, such as where the selected portions have been requested by each respective client computing device, e.g., based on an identifier such as one or more of an event identifier, a participant identifier, a viewer identifier, a parameter, a metric, and the like.

In such an instance, each of the one or more client computing devices may have a client application and an interactive graphical user interface for respectively rendering and displaying the received selected portions of the digital, e.g., image, content. In certain instance, the client application may provide one or more tools to control the displaying of the selected portions of the digital image content. Accordingly, via the provided tools, each client computing device may be configured for receiving user feedback data that is related to the displayed selected portions of the digital image content, such as where the feedback is provided in the form of user interactions provided via a window in an interactive graphical user interface of a display of the client computing device. Hence, in particular instances, the user interactions may include annotations to the selected portions of the digital image content, which user interactions and annotations may be communicated back to the server via the network.

Additionally, a connection framework may be provided, such as where the connection framework is configured for establishing a connection between one of the one or more interactive view panels of the content studio and a selected input and/or output of the one or more inputs/outputs of the studio platform. In various embodiments, the system may include a platform that is configured as a software-as-a-service (SaaS) system platform, which may be based on an application programming interface (API) call from the content studio to the SaaS platform upon activation of the content studio to display the video content selected by the user.

Accordingly, the system may include a software-as-a-system (SaaS) platform having one or more inputs and one or more outputs, such as where each of one or more inputs may be configured for receiving selected video content from the content studio. Likewise, each of one or more outputs may also be provided, such as where content ready for distribution may be compiled and made renderable or otherwise accessible via a uniform resource locator (URL) that can be rendered in a website of a recipient computing system that is configured for displaying the selected video content in the rendered URL. In such an instance, the SaaS platform may further include a mapping service configured to map each of the one or more inputs to at least one of the one or more outputs and/or the content to be transmitted thereby.

A server may also be included, and may be in communication with the content distribution platform and each recipient computing system, such as where a backend server is configured for receiving, from at least one of the one or more recipient computing systems, user feedback associated with the selected video content. A management hub may also be included, such as where the hub is configured to receive input representing details of an event, the details including one or more of a time, a duration, a location, an identification of one or more participants of the event, a schedule of participation of the one or more participants of the event, and other associated particulars, and or may further be configured for receiving or otherwise retrieving one or more observer comments, evaluation metrics, of the event that has been posted in the public domain, such as via a social media platform.

In one implementation, the management hub is configured not only to receive input representing details of an event, the details including one or more of a time, a duration, a location, an identification of one or more participants of the event, and a schedule of participation of the one or more participants of the event, but to also receive user or observer feedback, such as including receiving user feedback of those seeing the event real time, and commenting on the event, e.g., within a predetermined time period of displaying the selected video content. In various instances, therefore, a content distribution and fan input system may be provided that is configured for receiving user feedback and associating the feedback directly with captured audio and image content, which may then be sed to store, engage with, and transmit the content. In various instances, the system itself can engage with the content, parameters, and metrics, so as to perform a cleanup operation on the content, such as to remove unwanted or controversial content and/or bias from the content, such as prior to distribution thereof. For instance, in one instance, the user feedback may include a digital signal representing a qualitative or quantitative evaluation of the selected video content, which may be processed by the system, such as in scoring the content prior to its distribution.

Accordingly, the system may include a content receipt and distribution platform. For instance, a content distribution platform may be provided whereby the distribution platform may include one or more of an input module and an output module, or both of these functions may separate functionalities, such as handled by different associated server systems. In such an instance, an input system may be provided, where the input system includes one or more inputs, and also an output system may include one or more outputs, such as where each of the one or more inputs may be configured for receiving selected content, e.g., audio or video content, from one or more input devices, e.g., live streaming devices, and/or may retrieve content from a database associated with the content studio, such as via an application programming interface (API) call from the content studio. Likewise, the output system may communicate, e.g., via the content studio with the input system, whereby once a content stream has been input it can be directed to the content distribution platform for transmission, such as upon activation and direction of the content studio, such as for distribution and display, e.g., rendering of content. In various such instances, the output content, e.g., content selected by a system user, can be distributed and rendered for display at a recipient device. For example, each of the one or more outputs may serialize and encode the output content so as to be encapsulated within a uniform resource locator (URL) such that the content can be rendered in a website of a customer computing system that is configured for displaying the selected video content in the rendered URL.

In particular instances, the content input and distribution platform may be a combined system having one or more inputs and one or more outputs, whereby each of the one or more inputs may be configured for receiving input or selected video content, directly or via the content studio, via an application programming interface (API), e.g., via call from the content studio, to the content distribution platform upon activation of which the content can be distributed and made ready for display by an associated client computing device of a content recipient, such as where each of the one or more outputs having a uniform resource locator (URL) that can be rendered in a website of one or more customer computing systems that are configured for displaying the selected video content in the rendered URL.

Accordingly, in such instances, the system server may include a mapping module for mapping content from each of the one or more inputs, and/or channels of the content studio, to at least one of the one or more outputs. In certain implementations, the mapping service may be configured to map one or more inputs to at least one of the one or more outputs, such as based at least in part on a source of the video content. In other instances, the mapping service may be configured to map one or more inputs to at least one of the one or more outputs based at least in part on a destination of the collected, e.g., video, content. In various instances, the input content can be engaged with and/or its content can be tagged, and then the content can be distributed to one or more recipients, via a general or dedicated output channel, such as where the output channel and/or distribution may be selected by the user, or the system itself, based on at least one tag or other identifier, parameter, or metric.

In various embodiments, a method for using the system and/or its various components may be provided, such as for receiving, engaging with, and distributing content, e.g., audio, image, or video content, for instance, in a live or time delayed streaming manner. In such embodiments, various methods of the disclosure may include receiving, at a content studio or a management hub thereof, of a computing system, content to be engaged with and/or transmitted, such as without having to be broadcast. For these purposes, the method may include initializing and/or activating, or otherwise direct a system input to receive or retrieve content and/or content data.

The input of such materials may be content itself as well as metadata representing details of an event and its participants, as well as audio, image, and/or video content of the event as well as the performers participating in the event. The details of the event and/or its performer may include one or more parameters representing the event and/or participant particulars, such as the location, date, time, and description of the event, as well as a characterization of the performers, the biography, their characteristics, gender, height, weight performance history and the like. For example, such particulars may include one or more of a time, a duration, a location, an identification and/or characterization and/or history of one or more participants of the event, and a schedule of participation of the one or more participants of the event. Additional data may also be collected, such as metric data that evaluates past, present, or predicts future participation within the events as well as may also include dictum or evaluations that characterize the performance and/or the performer's activities when participating in a present or past event. Such metrics may include online evaluations of the performer that have been posted on one or more social media platforms, which expresses likes or dislikes, up or down votes, forwards, deletes, or other fan engagements characterizing the performance along one or more metrics.

Accordingly, a method for using the system or its components may include receiving or otherwise retrieving input content as well as associated data, e.g., characterization and/or evaluation data. Once collected, this content and associated data may be engaged with by the system, or a suer thereof, and/or may be stored. In particular instances, the content and/or associated data may be presented to a suitably configured content studio generated by the system, where by the content can be viewed and/or engaged with, or may be directly distributed to end users, such as for display thereby. Hence, in some instances, the method may include displaying, e.g., at an end user device and/or in a content studio the content. For instance, the content can be displayed, via the content studio, at one or more interactive view panels at a graphical user interface of the content studio. In such an instance, the content from the event may be supplied to one or more interactive view panels associated with the GUI of the content studio. In various implementations, content being displayed may be video content being provided to the content studio by one or more video cameras connected with the content studio via one or more inputs, or a database of the system, such as via a communication network.

Prior to or once displayed at the content studio, the content can be analyzed, categories, and/or tagged, such as with regard to one or more parameters or metrics, or with regard to any other desirable content identifier. In particular implementations, the content, or its component elements, may be tagged and/or classified according to one or more of the time, the duration, the location, the identification of one or more participants of the event, and the schedule of participation of the one or more participants of the event, activities engaged, and/or evaluations and/or scores and/or engagements the content has received. In such an instance, the method may include engaging with the material so as to product a final product and the controlling the output of the final product, such as via the content studio.

In various instances, the outputting may include streaming or otherwise distributing the end product content, e.g., video content, from the content studio to a content distribution platform having one or more outputs, such as where one or more of, e.g., each, of the one or more outputs may have a uniform resource locator (URL) that can be rendered in a web site of a customer computing system that is configured for displaying the selected video content in the rendered URL, so that a recipient can view and/or engage with the content, such as via the client application running on their recipient device. Hence, the method may include outputting or otherwise distributing, e.g., unicasting or multicasting directly, e.g., without the need for broadcasting, to at least one input of the content distribution platform, the content, e.g., selected video content, from the content studio to the recipient device. In various instances, such distribution may be via an application programming interface (API) call from the content studio to the content distribution platform, e.g., upon activation of the content studio, to display the video content selected for distribution. In such an instance, the method may include mapping, by a mapping service of the content distribution network, one or more of the one or more inputs to at least one of the one or more outputs. As motioned, said mapping may be preformed based on at least one tag selected by a user of the content studio, or based on a source of the video content, or based at least in part on a destination of the video content.

In various implementations, the system may include an artificial intelligence module that contains an inference engine and/or a machine learning unit together which form an AI learning platform that may be employed by the system, in conjunction with the content studio, to drive one or more analytics tasks of the various methods herein described, such as for the collecting receiving, retrieving, evaluating, engaging, and/or storing and/or distributing of content, such as audio, image, and/or video content, such as in real-time, streaming format. Particularly, the system may be configured to determine various relationships between content, content generators, and content consumer, to identify associated data points with respect thereto, to weight the identified data points and determined relationships, e.g., based on a number of instances of occurrence between the data points and relationships therebetween, and from this weighting make one or more identifications, categorizations, classifications, and/or predictive calls based on an inference derived between the datapoints and from the relationship there between. The one or more identifications, categorizations, classifications, and/or predicative calls may be made with respect to generating one or more rules for configuring one or more of the operations of the system.

Specifically, the system may be configured to collect or otherwise receive content, receive feedback regarding the collected content, including: comments, evaluations, judgements, scores, characterizations, parameterizations, metrics, and other relevant input from the various different users of the system, and or actors in an event, and then it may evaluate the received content, extracting therefrom the most salient features, scoring and/or weighting the features, categorizing, classifying, storing and retrieving the content and content elements, and then using the results of the feature extraction, scoring, and weighting to refine the rules of the system so as to better determine the most pertinent rules by which to perform the various methodologies herein described.

These methodologies may be related to one or more of identifying salient features of a performance, including who is performing and when, what is being performed, who is observing and/or collecting and/or engaging with the content, and determining or commenting on the quality of what is being performed, the scoring of what is being performed, such as with reference to another performer or a model of performance, and the quality of one or more images being collected and/or images, e.g., video feeds, being distributed. Hence, the system may be configured for both learning and selecting the best rules and/or examples for use in evaluating content of the system, such as image content, video content, video feeds, etc. of all the content received, evaluated, and/or scored by the system, which content may then be selected by the system to be input to one or more channels and/or be output, e.g., distributed (unicast or multi cast, or even broadcast, out to the various client devices of the system.

Specifically, the AI module may be configured for receiving various system data, such as content and/or analytic input data, such as characterization data of the competitors or other performers and/or content generators, and/or commenters in the event. For example, with respect to audio, image, video or other data collected by the system, the various data may be input or otherwise retrieved by the system, may be analyzed so as to be broken down into various different data points, which data points may then be mined so as to define relationships between data points, so as to form a knowledge graph that can be employed by the inference engine of the system to perform a predictive analyses so as to generate one or more predictions and/or inferences by which the system may be organized, by which performance may be measured, outcomes determined, and/or one or more queries can be run and answered. This data may then be used to determine which inputs to allow, which channels to utilize, and which content once collected, and/or engaged with, will be output, to whom, and using which output channels.

Such analyses may be performed for the purpose of determining performance, judging, such as with respect to bias in an event, predict an outcome of a performance, forecast a potential winner of the event, and/or to determine the mode of input and output, such as with respect channel selection and content generation and consumption grouping. The predictive analyses may also be employed for the purpose of facial and/or identity recognition, to tag identified participants, content generators, or viewers, to define exemplary or non-exemplary performances, as well as to judge subsequent performances based on identified exemplary performances, such as using past performances and/or system configuration models. Analytic feedback data, such as social media commentary evaluating one or more metrics of performance, e.g., from various of the performers, viewers, content generators, and/or content consumers in the event can also be collected and analyzed.

In view of the above, as can be seen with respect to FIG. 1, the system may be configured as a sports, entertainment, and/or personal/team activity engagement and/or coaching and/or gambling platform. The system includes a server having a plurality of engagement engines for organizing, moderating, facilitating and/or generating fan engagement, as well as for producing, collecting, interacting with, and distributing content, and for connecting and coordinating the functionalities of a multiplicity of client computing devices networking with the server via the fan engagement client application, whereby users of the system can engage with the content and one another and may make bets with respect to system or self-determined predicted outcomes.

Accordingly, as described herein, the system, in a basic form, includes a data collector, e.g., an audio-visual collection device of a content generator, which in various instances, may be an image capturing device, such as a camera for capturing an image of an actor or other performer performing the various tasks in the event, and a processing unit, such as a server, for processing the images. Typically, a plurality of image capturing devices, e.g., from a plurality of content generators, may be employed so as to capture the performer's or actor's actions from a number of different angles. The imaging devices may be official cameras, e.g., video cameras, or other user's, e.g., spectators' personal cameras, which images may be captured and/or automatically transmitted to a content studio of the system or a designated user thereof, such as a coach or other evaluator.

Likewise, a menu of selectable content collected, e.g., audio recordings, images, or videos, may be presented for selection and viewing. Particularly, a menu or table of menus of selectable content, e.g., videos, may be presented at a user interface of the content studio, where the table is divided into a number of categories, such as based on the particulars of an event, performance, or performer that is taking, or has taken, place. For instance, an event or a competition can include a number of participants performing a number of different techniques and/or procedures in the competition, whereby one or more judges, and/or a crowd, evaluates the performances based on each performers' ability to perform the techniques in comparison to one another.

A set of predictive rules may be presented along with an application of those rules to the event particulars, such that a predictive outcome may also be presented. A scoring and/or betting interface may also be provided, whereby fans may select a predicted outcome and/or place a predictive bet. In various embodiments, each performance of the various competitors in the competition can be captured and/or otherwise be collected by the system, such as video content, whereby the content can be classified and/or stored within one more libraries of a database of the system.

For instance, the system, or a user thereof, can analyze the collected content, and can classify it in accordance with a variety categories. Particularly, the content, the performers therein, and its elemental parts, can be analyzed and used to classify the content so as to be stored with in one or more categories of one or more structured libraries of the database. More particularly, the system can embed the content, e.g., image or video content, with metadata defining the content by its elements, such that it can be stored and easily be searched and retrieved by the system. For example, the content can be classified based event particulars or consumer engagement metrics, such as particulars of the event, the event date, the various sessions, rounds, or heats conducted, the type of activities, e.g., maneuvers, performed, the round particulars, such as the wave number, number of at bats, number of holes played, and the like, as well as such evaluative metrics including positive and negative commentary of the event and its participants, such as likes, dislikes, up or down votes, trending up or down, forwards, deletes, positive or negative emojis, and the like.

In view of the above, in one aspect, the system may be configured for allowing generated or otherwise captured content to be interacted with such as for the purpose of evaluating, coaching, predicting, and betting, or otherwise commenting on the content or its subject matter. For instance, in various embodiments, the content studio may include a dashboard workspace wherein selected content, e.g., video content, may be identified for collection and input into the system, for storage, and retrieval, and engagement therewith. Particularly, in various instances, the dashboard workspace may present one or more panels, e.g., display panels, by which to view and/or engage with the content of a collected video. More particularly, a plurality of computing devices and/or displays thereof may be provided, whereby one display presents a workspace within which a selected content may be viewed or listened to, while the other computing device provides a workspace whereby the same selected video may not only be viewed but may be engaged. In various instances, each view panel of the respective workspace may be provided at a separate computing device, or in other instances, the work spaces may be generated as a plurality of display panels at a single dashboard interface of a single computing device, whereby in one view panel a selected content item, e.g., video, may be viewed, while in a second view panel an engagement operation may be performed, such as with respect to that selected view panel, such as for viewing the event and one panel, and commenting or betting on the event in another panel, such as where the size and odds of the bet, as well as the chance to win and any other multiplier may be presented by the system or a user thereof.

Accordingly, in various embodiments, the system may be configured for providing a platform by which to view and/or engage with collected content. For instance, the selected content may be interacted with such as to score a performer in an activity of an event. For example, a workspace may be provided whereby a performance by a participant in an event may be viewed, e.g., in one panel, while in another panel, a scoring matrix may be provided so as to score the participant's performance. A text box may be provided within which one or more comments may be posted such that the score and/or comments can then be embedded into, or otherwise associated with, the video so as to be transmitted therewith. With respect to performing one or more scoring methodologies and with regard to configuring the present system so as to perform such scoring, the present disclosure refers to U.S. Pat. No. 10,322,330, entitled: SYSTEMS, DEVICES, AND METHODS EMPLOYING THE SAME FOR ENHANCING AUDIENCE ENGAGEMENT IN A COMPETITION OR PERFORMANCE, the contents of which are incorporated by reference in its entirety for all purposes.

In various instances, the system server may include, or otherwise be associated with, a presentation building engine, such as for generating one or more interactive presentation panels in the interactive graphical user interface of the content studio, whereby one or more content, e.g., video, image, audio, or text, elements, may be combined and integrated together. In such an instance, a user may use the content studio in a method that includes retrieving, by a processing engine of the content studio, for display at a display panel, a selected content, e.g., video, from the structured library for presentation in one of the one or more interactive presentation panels. A tool module may also be generated and presented, e.g., at a second display panel, for generating one or more graphical engagement tools. Hence, the user may be provided one or more graphical tools in a tool panel in the interactive graphical user interface. For instance, each of the graphical tools presented in the tool panel may be configured to receive an input, e.g., from a user of the system, for controlling the presentation of one or more selected content items, such as where at least one of the graphical tools may be adapted for annotating a selected content item being presented in one or more of the interactive presentation panels.

For example, a user of the system may select a video to engage with, the system may then generate an engagement panel in which the selected video may be displayed, e.g., via the GUI, and then the user, engaging the one or more presented graphical tools, may then interact with the selected video so as to make a composite end product, such as an annotated video. In view of this, the system may include a compiler, and, hence, during the interaction process with the content, a method may include receiving, by the compiler, annotations and/or edits to the selected content to generate an annotated content for storage in the repository in accordance with the one or more activity-related identifiers. Likewise, once stored, the content may be retrieved, e.g., a stored annotated video, and may then be distributed by one or more identified output channels to one or more recipients.

Likewise, instead of engaging directly with the selected content item, the user may engage with a prediction and/or betting module, presented at a different display panel, whereby one or more real or test bets and amounts may be made, e.g., by engaging with a betting presentation module of the system, and once the bet has been made the prediction module may indicate the chance of winning, the amount to be won, if any, and may further show how activities that take place in the event may change the odds of winning, and may allow the user to increase, decrease, or otherwise leverage their bet, e.g., a further bet can be placed as to whether the original bet will be won or lost. Once the event is over, statistic showing how well the predicted outcomes performed may also be presented.

Accordingly, as indicated above, the system may include an analytics module for performing various analytics as to a performance in an event, which performance can be broken down and presented at a dashboard panel generated at a graphical user interface, and real time analytic analyses can also be presented, near real-time, along with odds characterizing the same, such as in an associated view panel. Various analytics may be generated and displayed such as with regard to event particulars, particular campaigns being run, the various competitors and judges of the events of the system, commentaries of observers, and the like. Such analytics may include an analysis of the various performers, the various performances, the odds of winning or losing, and the chances the one or another system engager will be successful in achieving a predictive outcome. These analytics may be ongoing, may change during the course of the event, and may be presented in a variety of forms, such as via one or more graphs, such as a dot and line graph, a bar graph, a wave graph, an interactive map, and the like. Likewise, the analytics may take count of and track the number of user watching and evaluating the event and/or engaging on social media with respect thereto, such as with respect to the number and identity of various social media engagements, such as posts referring to the event, performance, or performer on FACEBOOK®, TWITTER®, and other social media modalities, which can be tracked and presented for display.

Specifically, in various instances, the server system may be configured to serve digital image content, via live stream or previous recoding and storage, can retrieve and analyze the content real-time or post performance, and can determine and present statistical data pertaining thereto to each of a plurality of client computing devices sequentially or substantially simultaneously. In such an instance, the served digital image and/or betting content may include video content, an analysis of the content, e.g., with respect to the performer and/or performance, and the server system may be configured to serve the video and analytical content substantially in real-time of receiving and/or analyzing the video content. Likewise, once served, the platform may further be configured for allowing the served content to be interacted with and/or betted on, and thus, the platform may further be configured to receive feedback data representing user interactive feedback with the served digital image content, so as to generate annotated content and/or predictive scores and/or results.

More specifically, in certain embodiments, the feedback data may include a graphical annotation and/or betting data pertaining to the served digital image and/or analytic content. Once generated, the server may then store the feedback data, and update the analytical content with the served digital image content in the memory. In various embodiments, the server may be configured for aggregating the feedback data, and to serve the aggregated feedback data to the plurality of client computing devices. In such instances, the feedback data may include a quantitative or qualitative score of the served digital image content, a prediction as to an outcome, and can include feedback as to how the event was run, the level of engagement for each aspect of the event, especially with respect to the competitors and judges, and how well the performers and/or betters did with respect to their predicted outcomes, and such data can be collated, aggregated, weighted, scaled, and summed, so as to be used by users with respect to future events.

Accordingly, in various embodiments, a computing device of the system, such as including one or more processing engines, may be configured for determining one or more likelihood propositions. For instance, the system may be configured for determining a likelihood that a given score or predicted outcome or other evaluation will likely occur or not. Likewise, one or more statistical analyses may be performed, such as for determining an average, a mean, a mode, a standard deviation for a collection of scores, predicted outcomes, and/or other evaluations being entered in to the system. The results of these scores, predictions, e.g., bets, or other evaluations, and/or attendant analyses, and system predicted outcomes, may be compared to scores and evaluations that have previously been given, e.g., by one or more scorers or evaluators, and can further be compared to historical records measuring the same factors, e.g., from the same or different scorers, bettors, and/or evaluators.

The results of these analyses and comparisons can be employed for a number of different purposes, such as for determining the odds of a performer achieving their objective and/or a bet wining, determining appropriate score and/or betting and/or odds corrections, and making predictions as to what future outcomes and/or scores and/or bets will be. In such instances, guidance may be determined as to how to improve one or more outcomes or scores, or bets, and the like, which may also be presented for display. Consequently, a number of different factors, both with respect to the event and with respect to how others engaged with the event, either directly or through their comments with respect thereto, e.g., other social factors, may be collected, analyzed, and be employed by the system in making predictive outcomes and/or providing feedback with respect thereto. Such factors to be collected and/or considered may pertain to the event, the performance, and the performer and/or to one or more betters as well as their backgrounds and prior activities of they engaged in, whether related to the event or not. These data may be collected, analyzed by the system, and employed for determining one or more outcomes.

In view of the preceding, likelihoods regarding various outcomes may be determined. For example, particular event or performance outcomes can be determined, or at least may be predicted, based on prior outcomes and the conditions that have led to the achievement of those outcomes. For instance, past performances from a performer, past scores from a scorer, past bets or a bettor, e.g., wins, losses, and amounts, as well as conditions and environments, can all be collected, analyzed, determined, and used as one or more factors in making one or more future predictions as to one or more new outcomes. Additionally, a number of data, e.g., bets, scores and/or evaluations, entered into the system from different sources, e.g., from judges, scorers, bettors, or other evaluations, may be received at a system server, may be aggregated, compiled, and used to determine and/or predict bias, outcomes, and the like. One or more of these analyses may be performed for the purposes of determining one or more odds of one or more outcomes being predicted to occur.

Further, a likelihood determination may be made with respect to determining a competitor in an event, a scorer, bettor, or other participant in the crowd, or a given occurrence of a particular condition. Such a determination may be made via an image, e.g., facial or factor or other pattern, recognition analysis. Particularly, an identification of a participant in or better on an event may be made by the system, such as where the system may analyze a variety of prior instances of the performer or bettor from a plurality of different captured content, such as photos and videos and other online engagements. In various embodiments, the identification may be made based on a number of different cognizable features of the participant, the bettor, or their surroundings, as well as the attributed name or other identifiers associated with the participant, and the like.

In various instances, image data may be analyzed so as to determine the identity of participants, conditions, and/or other factors based on system recognizable features that can be used to make an identification determination. The system may also be configured for determining the likelihood that a given participant captured in an image is going to improve or falter or maintain the same level of performance throughout the event. So being, the physiological and/or environmental condition data may be fed into the system and may be used to make one or more predictions based on these conditions, and/or to give one or more suggestions to the performer and/or a coach thereof. Particularly, the various physiological data of participants, e.g., bettors, can be retrieved by the system, compared to historical data, and then the results of that comparison can be used to make one or more predictions about their performance.

Additionally, various system functionalities and/or methodologies may make use of one or more likelihood determinations, as described herein, such as with respect to determining where an active part of an event is, what an optimal point of view for capturing that action would be, identifying a capturing device having the optimal point of view, and selecting that device as being a primary device for capturing and streaming content of the event. Hence, the system may be configured for determining the likelihood that a given user device will capture data, e.g., image content, that is deemed to be of particular value to the system, its users, and the event viewer, e.g., so as to determine which cameras to use to capture and display captured content. Although the preceding has been described with respect to the methodologies of capturing and evaluating image content of the events and their participants, the configuration and implementation of other methodologies described herein may also be executed in like manner.

In view of the above, all of these systems, methodologies, and their processes can be implemented and evaluated by the AI module of the system. For instance, various data may be collected or otherwise retrieved by the system, the data may be parsed and employed as one or more data points within a structured database, and a mapping function may be performed so as to map one or more of relationships between the data points and the factors and/or the conditions leading to them. These factors and conditions as well as their relationships may be employed so as to make one or more predictive outcomes.

Specifically, various relationships between data points and their conditions may be defined and weighted, where previously known or determined instances of one or more relevant occurrences of a condition may be used to increase or decrease a weighting of a likelihood that the same or similar preconditions will result in the same or similar past conditions given an occurrence of a predictive event. In various instances, when making a likelihood determination an extreme likelihood, e.g. of an event occurring, may be within a range from about 95% to about 100%, a high degree of likelihood may be within a range from about 90% to about 94%, a good degree of likelihood may be within a range from about 85% to about 89%, a moderate degree of likelihood may be within a range from about 80% to about 84%, an average degree of likelihood may be within a range from about 75% to about 79%, a below average degree of likelihood may be within a range from about 70% to about 74%, a low degree of likelihood may be within a range from about 65% to about 69%, a very low degree of likelihood may be within a range from about 60% to about 64%, and an extremely low degree of likelihood may be within a range from about 50% to about 59%.

For example, the server system may include an artificial intelligence module that includes a machine learning component as well as an inference engine. Particularly, the system may include an inference engine that may be configured for accessing one or more libraries of a structured database and determining a number of known instances between one or more conditions and relationships between the one or more conditions and using those known conditions, relationships, and the instances between them so as to make one or more predictions about unknown conditions, relationships, and/or instances. Specifically, such data may include a time, a location, and one or more other conditions, such as commonality factors, which data may be stored in a structured database in a manner to generate one or more relationships therebetween.

In view of these data points and relationships, various instances between them can be weighted, and one or more predictions, such as to the likelihood that bias is present may be determined, such as with respect to the presence of bias in a generated score. Such analysis may be performed in a manner that compares a present performance, or instance, with prior performances and/or instances. In such an instance, for each known instance, a weighting for their respective relationships may be increased, where the greater the weighting the greater the likelihood is determined to be. As indicated, such likelihood determinations may be made with respect to a variety of factors herein disclosed, such as with regard to performing a judging, betting, bias, and/or outcome analysis, an identification and/or tagging analysis, an outcome or betting analysis, e.g., a calculation of odds of an outcome, a system configuration analysis, such as an analysis regarding which input device to allocate as a primary device.

Further, in various embodiments, the server system may include an inference engine, which may be configured for identifying one or more trends, likely outcomes, and/or one or more conflicts with respect thereto, e.g., between various of the data within the system along with the results of its conditions and/or analysis, and one or more new predictive outcomes can be made or one or more flags of a conflict may be generated, such as for further analysis by the system and/or its users. When such a predictive outcome or flag has been identified, the system may further be configured for performing a search of one or more databases of the system so as to identify one or more data that may be used to characterize and/or correct the conflict and/or generate a new predictive model. In particular embodiments, where a flag has been identified, and where a search has either identified or not identified corrective information, one or more user prompted inputs may be generated and presented to a system administrator for correcting the conflict and/or re-calibrating the system in view of the conflict.

Further, with respect to the artificial intelligence module, in one aspect, a cloud accessible artificial intelligence module is provided, and is configured for being communicably and operably coupled to one or more of the other components of the processing pipeline disclosed herein. For instance, the AI module may work closely with a suitably configured workflow management system so as to efficiently direct and/or control the various processes of the system disclosed herein. Accordingly, provided herein, is an AI module that is configured for acting as an interface between one or more characteristics of an individual and one or more activities they engage in, e.g., either one or more performances or one or more evaluations of or bets they make on those performances, such as with respect to performing a scoring, coaching, and/or betting operation. These analyses may be performed for a number of different purposes, such as for determining bias, betting, odds, and the like, as well as for determining the identity of a participant, bettor, content generator, content consumer, and the like, such as based on a recognition of one or more patterns, trends, images, and/or the actions they take.

For instance, in various instances, the system may be configured for receiving input data, such as data entered into the system as a response to one or more performances, which data may include an individual's past or present performance or betting data, as well as evaluation data entered in to the system with regard to an evaluation of the respective performance or success as betting. In such an instance, the workflow manager system may be configured for receiving and analyzing the input data, and other such data, and performing one or more analyses on the data so to determine one or more correlations there between. For example, in various embodiments, the methods and/or systems herein disclosed may be adapted for correlating an individual's personal characteristic data to their performance, betting, and/or evaluation data they enter into the system. Such data may include a variety of past activity data, past and present social engagement data, and/or the like.

Specifically, as described herein, in various implementations, the system may be configured for determining when an evaluation or bet being made involves bias, a pattern, a trend, or includes any other relationship of question or interest. In further implementations, the system may be configured for autonomously identifying and/or tagging a performer, content generator, content consumer, or bettor in a captured performance. Additional implementations may include the prediction of one or more outcomes as well as the generation of instructions for improving or otherwise enhancing an actual or predicted outcome. These predictions may be used for generating odds and/or for use in configuring a betting module by which one or more bets may be placed as to one or more outcomes, where a payout is determined and weighted by one or more of odds as determined by the system.

Accordingly, presented herein is a system for searching a database, such as a structured database, identifying one or more results fitting a search criteria, and correlating data. For instance, a variety of data may be correlated, such as personal characteristic and/or social network data, event, heat, round, and/or other competition data, environmental and/or condition data, as well as bettor performance data. Additional data may be evaluated and considered, including past activity and/or scoring and/or betting and/or performance data, such as a score or annotation data, which may be entered or otherwise collected data, or it may be captured or retrieved data, such as from one or more images.

Such data may be correlated with respect to past, historical information, with regard to a single actor, e.g., evaluator or performer, and/or between different actors, in the present or with respect to past performances. In various embodiments, components of the system may include one or more of a server, including a processor, a database, such as a structured database, one or more sources for actor related data, a search browser, and the like. In particular embodiments, the system may be configured to encrypt data files as that data is uploaded, or otherwise entered into the system, so as to ensure the maintenance of privacy. The data files, e.g., records and/or index files regarding past actions and performances, may be transmitted from each source of generation or storage to a repository using any suitable transference protocol, and may be searchable, such as via a browser. The browser may be configured for searching the plurality of files, such as via use of the one or more index files. The server may be a plurality of servers.

In various instances, the system may be configured for running a plurality of workflows, and may, therefore, include a workflow manager for implementing one or more of the analyses described herein, which in some instances, can be implemented in a processing pipelined configuration. Accordingly, as disclosed herein, the system may not only be configured for receiving user data, e.g., performance, betting, or evaluation data, but in various instances, the system may further be configured for correlating the received data with a database of stored performance and/or evaluation data. In various instances, this data may be used to determine which input devices and channels to be dedicated to the performance, and/or which output devices and channels to dedicated for distribution of content pertaining to the event. For instance, the AI module may be configured for analyzing one performance or bet in relation to another, such as with respect to the performance, or bet thereon, of one or more activities in a routine of activities, whereby the two performers or bettors can be classified such as with respect to the degree of correspondence between them.

Particularly, two or more performances can be compared one with another and the percentage similarity, e.g., correspondence, between the two or more performances can be determined, collectively, and with respect to each maneuver performed in a routine of maneuvers. Likewise, various evaluations made from one or more evaluators or bettors may also be compered, such as with respect to evaluations and/or bets made across performers or amongst the same performer across heats and/or events, such as over time. The workflow manager of the system may be configured for implementing one or more deterministic rule systems, concurrently with respect to a multiplicity of events, at a multiplicity of different regions, so as to derive results data pursuant to its analysis of the performance and evaluation data.

For example, in certain embodiments, the system may include a variety of different databases, which various databases of the system may be configured so as to have a relational architecture, which may further be adapted to include one or more constructions. These constructions may be represented by one or more table structures. A series of tables, for instance, may be employed by which correlations may be made by the WMS in an iterative fashion. Particularly, in various use models, a first correlation may be made with respect to an individual's activities, e.g., their evaluations and/or performances, across times and/or across events, which may be included in one or more tables. Another table may then be employed to correlate the individual's activities with respect to another actor and/or other's activities, such as where the activity can be an evaluation and/or a performance and/or the like. Likewise, with the appropriate feedback entered into the system, a further table may also be included and used to correlate the activities amongst various different individuals, at a variety of different times and/or dates, such as in determining the level of correspondence between them.

A key may be used to correlate the tables, which key may be accessed in response to question prompt or command. The key may be any common identifier, such as a name, a number, a nickname, a handle, a phone number, and the like, by which one or more of the tables may be accessed, correlated, and/or a question answered. Without the key, it becomes more difficult to build correlations between the information in one table with that of another.

Accordingly, a useful aspect of the present technology is a data structure for answering a query, wherein the data architecture may be structured and searched in response to a query. In a typical architecture the database may be a relational database, such as a Structured Query Language (SQL) database, which may be implemented via a relational database management system (WMS). For example, in one implementation, the SQL database may be a document based database, such as where one or more tables, e.g., look up tables (LUT), form a structure wherein data may be stored, searched, relations determined, and queries answered. Particularly, in various embodiments, a documents or table based database may be presented, searched, and used to determine relationships from which answers to one or more queries may be determined.

For instance, typically, SQL databases have a relational architecture. These constructions may be represented by a table structure. A series of tables, for instance, may then be employed by which correlations may be made in an iterative fashion. For example, with respect to the correspondence analyses discussed herein, a first correlation may be made with respect to a performers performance, such as with respect to one of their goals in the performance, and with respect to a first evaluation being made on that performance. Then the evaluated performance of the performer can be compared to that of another, such as a performer having achieved a higher, e.g., the top score, and the correspondence between the two performers can be determined and analyzed.

A result of the analysis may be a determined correspondence for a number of actions taken by one performer in comparison to another, along with a determination accounting for why the score of one performer differed from another, such as based on an evaluation made by a third party evaluator, or by the system itself running an evaluation protocol on a databases of images of performers having been scored for performing the same or similar activity. This data may then be used to provide feedback and/or instructions to the one performer versus the other such as with respect to improving their performance. Another table may then be employed to correlate the individual's performance goals with those of others and stepwise methodology for improvement can be suggested by the system, with identified FIGURES providing examples of performance improvements to be made. Likewise, as indicated above, a further table may be used to correlate the progress of the individual, across performances, towards improvement of their performance, e.g., across a single or multiple events.

A further data architecture that may be used to structure a database of the system is a data tree, where various data elements may be stored in a compressed, but correlated fashion, and/or in a hash table, as described herein above. In certain instances, the database to be deployed by the system may have a graph based architecture, which database may be structured and used to determine the results for one or more queries. Particularly, a knowledge graph architecture may be employed to structure the database, so as to enhance the performance of computational analyses executed using that database. In certain instances, the sophisticated algorithms disclosed herein, are adapted for structuring the infrastructure of a relational database so as to enable more efficient and accurate searching such as via performing graph based analyses, as well as for performing table or tree based analyses.

Consequently, in one aspect, a device, system, and methods of using the same to build a searchable, relational data structure, such as described herein, are provided. For instance, in one instance, the machines and methods disclosed herein may be employed so as to generate and/or otherwise collect data. Specifically, the machines and methods disclosed herein may be used to generate a searchable data structure for storing that data in a relational architecture. In various instances, additional data may be generated or otherwise be transmitted into the system, such as via a suitably configured API, which data may also be configured for being stored in the relational data structure, such as other characteristic data of a performer and/or evaluator.

For instance, in another aspect of the disclosure, the system may include an artificial intelligence (AI) module that may be configured to provide a more comprehensive analysis on generated and/or provided data. For example, the AI module may be configured so as to implement one or more machine learning protocols on the data attained by the system that are devised to teach the AI module to perform one or more correlations, such as between various activities taken by one performer in comparison to another performer, e.g., one bettor in comparison to the best they place or with respect to another bettor, and/or one performance in comparison to another performance, and/or with respect to scores given to the respective performers by the same or different judges or evaluators. Specifically, the AI module may be configured for receiving one or more inputs, e.g., of captured content, such as images and video, and may be adapted for building and structuring a database.

For instance, in a first step, data, such as image and/or characteristic data of a performer or evaluator or bettor, may be collected, cleaned, and then be prepared for analysis. In various embodiments, the data may be labeled and/or categorized, such as with respect to one or more classifications. For example, a skimmer may be implemented for the purposes of structuring the database, such as for providing a relational structure to the database. And once the database is structured, it may then be populated with data, in accordance with determined or inferred relationships.

In certain instances, a machine learning protocol, as disclosed herein, may be employed so as to determine relationships between data points entered into the database. Such relationships may be determined based on known facts, and as such the learning may be supervised learning, e.g., such as where the data entered into the database is categorized in accordance with one or more categories and/or labels. Particularly, known factors may be used to label, categorize, and store data, which may be informed by the query being sought to be answered. Hence, knowing factors by which to label and categorize the data being stored makes building the storage architecture more efficient.

In other instances, the learning may be inferred, such as in an unsupervised learning. For instance, in certain instances, the data to be stored may not be known, relationships between the data may not have been determined, and the query to be answered may also not be identified. In such instances, the data to be stored is unsupervised, and as such, patterns in data to be stored and their relationships, such as commonalities between data points, may be determined, and once determined such patterns may then be used in forming the architecture that structures the data storage. For example, in various embodiments, the AI module may include programming directed at training the system to more rapidly, e.g., instantly, recognize how an output was achieved based on the type and characteristics of the input received. The system, therefore, may be configured for learning from the inputs it receives, and the results it outputs, so as to be able to draw correlations more rapidly and accurately based on the initial input of data received.

Typically, the input data may be of two general types. In a first instance, the data may be of a type where the output, e.g., the answer, is known. This type of data may be input into the system and used for training purposes. This data may be any form of known data, but in various instances, may be image and/or evaluation data pertaining to an activity, such as a performance, where the performance and/or its component parts have known scores and/or other evaluations associated therewith. The second type of data may be data where the answer is unknown, and therefore, must be determined. This data may be any form of data, but where one or more aspects of the data is not known, which in various instances, may be image and/or evaluation data pertaining to a performance where an evaluative score is not known.

In various instances, one or more of these two types of data may be compared one with itself, such as to train a model, such as for evaluating and/or scoring a performance, where the outcome is known, and/or the two types of data may be compared one with another such as to apply the model developed with known scored items so as to evaluate a performance with activities that have not been scored. In this manner, one or more known categories of improvement can be identified and highlighted by the system, such as with respect to providing known image data as to how an improvement in performance can be made and by what degree. Hence, effect data, such as feedback data may be elicited from an evaluator, judge, performer, bettor, or other system user with respect to what extent the change in how an activity is performed leads to an increase or a decrease in score or successful desired outcome for the individual system user.

Particularly, in combining these two datasets, the AI module may be configured for determining the various interrelationships between them. Accordingly, at the heart of the AI platform may be a structured architecture, such as a graph based database, which may be configured for receiving data from a plurality of different sources, such as from a variety of different performances from the same or a variety of different performers, as described herein. This data may then be used to train the performer, and may also be used to train an evaluator thereof, such as where their entered evaluations may be compared against a pool of other evaluators having viewed and scored and/or betted on the same performance.

More particularly, this effect data may be used to enhance the AI module's ability to learn from the first type of input data, condition data, so as to better predict the outcome for the second kind of input data, inferred performance improvement data, so as to be better correlate performance activities with performance scores, such as in a positive or negative manner. Specifically, based on historical evidence, the AI module may be configured to learn to predict outcomes based on previously observed data, such as with respect to various of the individual users of the system experiencing the same or similar conditions or affects from having performed the same or similar activities and received the same or similar scores. Differences with respect to the preceding can likewise be analyzed.

More specifically, a performance and/or evaluation platform is presented herein, wherein the platform is configured to correlate images of performances with evaluation data pertaining to those various performances. In such an instance, one or more user profiles may be generated for various of the users of the system, such as various competitors in a performance, evaluators tasked with judging those performances, bettors betting on those performances, as well as content generators and/or content consumers thereof. These user profiles may be generated by subjecting one or more of the users to an interview process designed to elicit answers pertaining to one or more of goals of a performance and/or evaluation, and/or the system may perform one or more searches for online, public content about the actor, which can then be employed by the system in generating a user profile. This data may then be used for a variety of purposes, such as for identifying the performer, e.g., tagging them within an image, and/or for determining bias, and the like.

As indicated, the system may be configured for employing the received data in one or more learning protocols, such as for machine learning. Particularly, the machine learning component of the disclosure is useful in enabling the system to learn to identify images and identities and actions within images, such as with regard to identifying performers or other actors, the actions of performers or other actors, e.g., bettors, the scores, evaluations, and/or bets or other content input, all of which can be used to characterize the different actors of the various methods disclosed herein so as to identify one or more trends and/or characteristics thereof. Machine learning takes place by training the system to instantly recognize how an output was achieved based on the type and characteristics of the input received.

The present system is configured for learning from the inputs it receives, e.g., images, scores, bets, judgments, and other evaluations, and the results it outputs, so as to learn to draw correlations more rapidly and accurately based on the initial input of data received, the results of which can then be employed by an inference engine of the system so as to make one or more inferences, or predictions based thereon. In implementing the ML protocol of the system, the ML component receives a first set of data wherein the outcome is known, and this data is employed by the system to generate one or more rules by which a result may be obtained, and once obtained compared to the known outcome.

For instance, the ML component may receive scored and evaluated content of known performers, and this material can be used to predict the performances of unknown performers with regard to their actions, and can then be error corrected by receiving known scores for those performances, whereby the predicted score can be compared to the received known scores. Consequently, the system is configured to train itself to better recognize correlations between data points, e.g., actions leading to scores, within the database more accurately, e.g., with less false positives, and more efficiently, and to make predictive outcomes.

In such a manner the machine learning algorithm may learn identities and behaviors, determine accuracy and competence in performance, and may be used by the artificial intelligence module to analyze further sample sets with respect to answering one or more search queries, such as a query requiring the AI module to infer correlations between nodes or datasets and/or the relationships between them. Hence, once the AI machine learns the behavior, the learned behavior may then be applied to a second type of data, such as an inference engine, that is used to answer one or more unknown variables. Particularly, known scores and evaluations associated with known performers engaging in known activities can be used to score and evaluate other performers engaging in the same or similar activities.

The more the machine learns from the first type of input data, the better the inference engine becomes at predicting the outcome for the second kind of input data. Specifically, based on historical evidence, the artificial intelligence module may be configured to learn to predict or otherwise infer outcomes based on previously observed data. With respect to scoring, betting, judging, and evaluations, known scores, bets, and evaluations of known performers and actors can be used to predict how future evaluators should evaluate activities, such as for determining bias and/or training a user how to score, bet, judge, and/or evaluate, can be used to train the machine itself to learn to perform a scoring, betting, judging, and/or evaluation process. In such an instance, the self-reported conditions and effects profiles of subjects with regard to their betting, scoring and evaluations may be assessed along with a description of the actions they took and how they evaluate their performance with regard to those actions taken. Particularly, in order to combine these two, their interrelationships may be determined.

Accordingly, in a first step, a graph database or knowledge graph may be constructed. For example, in this instance, the knowledge graph may be composed of three typical elements, which basically include a subject, a predicate, and an object, these may form nodes, and the relationship between the nodes must be determined. Any particular data point may be selected as a node, and nodes may vary based on the queries being performed.

There are several different types of relationships that can be determined. For instance, relationships may be determined based on their effects, e.g., they are effect based; or they may be determined based on inferences, e.g., relationships that are unknown but determinable, and hence they are inference based. Particularly, each effect and/or relationship may be characterized by different properties or characteristics, which characteristics may be used to generate weights, probabilities, make assumptions, and the like. Such properties may be used to populate the knowledge graph with data points that may form the nodes of the graph. Where a probability determination is to be performed, a very high degree of probability may be within a range from about 95% to about 100%, a high degree of probability may be within a range from about 90% to about 94%, a good degree of probability may be within a range from about 85% to about 89%, a moderate degree of probability may be within a range from about 80% to about 84%, an average degree of probability may be within a range from about 75% to about 79%, a below average degree of probability may be within a range from about 70% to about 74%, a low degree of probability may be within a range from about 65% to about 69%, a very low degree of probability may be within a range from about 60% to about 64%, and an extremely low degree of probability may be within a range from about 50% to about 59%.

More particularly, to better determine causal and/or predictable outcomes the various different relationships may be weighted, such as based on the degree of certainty, number of commonalities, number of instances sharing the node, number of common relationships, and the like, such as with respect to identifying individual's their actions, and the evaluations of those actions, as described herein. In various embodiments, a schema may be formed, such as where the schema is an architecture that is used to give structure to the graph. Hence, the construction and implementation of a dynamic knowledge graph may be at the heart of the wellness analysis platform.

For example, with respect to constructing the knowledge graph, any particular data point may form a node. For instance, on one side of the graph actions to be taken, e.g., performance routines and/or scores entered, may form one set of nodes, and the accuracy of those actions taken may form a second set of nodes. In between these two nodes may be a third node, e.g., a series of third nodes, such as one or more conditions, properties, characteristics, personality traits, all of which may be employed so as to infer and/or build relationships between the two nodes that can be used to determine how the first node is related to second node, e.g., is caused thereby. Accordingly, in between these nodes are the relationships that may be determined.

Specifically, when building the knowledge graph, participant data input into the system, such as from an individual's performance or evaluation of a performance, images related thereto, and uploaded data, e.g., social media and network connections, family history, environment, psychological conditions, etc. that may be encrypted and securely transferred electronically to the system may be used to generate personal profiles therefore. Actions taken by the participants and the results thereof, e.g., effects, can then form a second and/or third node of the graph, such as with respect to an evaluation being made based on the factors of the first node. Once these two/three nodes have been established one or more further nodes may be input into the system, from the presence of which the relationship(s) between the original nodes may be determined.

For instance, in one example, a first node may be represented by the actions and/or goals of a first person or a population of people, and a second node may be represented by a condition or characteristic and individual has for improvement. In such an instance, one or more third nodes may be input to the system and generated within the graph, such as where the third node may be a score or evaluation of an activity that can be a model used to improve the activity so as to achieve the recited goal and/or the like. A series of relationships may then be determined by analyzing various points of connection between these three items. Likewise, this process may be repeated for multiple individual's having the same or similar goals and/or experiencing the same or similar conditions. Hence, in a manner such as this, the correlation between individuals' performance and the activities and/or scores that affect those goals may be determined.

Accordingly, a step in building a performance analysis graph is to define the anchor nodes, these represent the two bounding elements between which all the various commonalities may be defined and explored. A further step is to define all the possible known correspondences between the two or three anchor nodes, which may be represented in the graph as a further node. These known correspondences may be built around detailing the effects caused by and/or the characteristics of one node or the other. These may form the known and/or observable relationships between the nodes. From these known relationships, a second type of relationship may be explored and/or determined which relationships may be built on inferences. Further, to better determine causal and/or predictable outcomes the various different relationships may be weighted, such as based on the degree of certainty, number of commonalities, number of instances sharing the node, number of common relationships, and the like, such as where there is a correspondence between the performance of one actor with that of another, for instance, where one may be used as a model for the other.

Hence, in various embodiments, the construction and implementation of a dynamic knowledge graph is at the heart of the clinical genomics processing platform. As indicated, the various processing platforms of the global system may be coupled together, so as to seamlessly transfer data between its various components. For instance, as indicated, the receiving and transferring of captured image, scoring, and evaluation, e.g., raw data, to the artificial intelligence module may be performed in a substantially seamless manner, such as via a hyper-interconnect.

Particularly, the AI module may be configured for receiving the input raw data, e.g., captured images, e.g., video, scores, bets, judgements, and evaluations thereof, and the like, and for taking the raw data and using it to generate one or more nodes, e.g., personalized to the individual participant, within the knowledge graph. Further, as indicated, the AI module may be configured for receiving input data from one or more other sources, such as from an image capturing or scoring device employed at an event, and the like. In various instances, the image and/or evaluation data include data pertaining to the performers, participants, actors, e.g., bettors, content generators, etc. their identities, performances and actions taken, and the like. This data may be used to more fully develop the individualized nodes of the disclosure, and for taking that data and using it to generate one or more nodes and define one more relationships there between within the knowledge graph.

Furthermore, the system may further be configured for retrieving data about one or more participants and/or the actions they take, and/or the images within which they have been captured, which data once collected may be used to generate a further set of nodes within the knowledge graph. The system may retrieve pertinent image and evaluation and/or betting and judgment data, such as by direct connection via a network interface, a suitably configured API, an association with one or more social media interfaces, and/or may include a skimmer or search engine that collects data, e.g., online data, that pertains to the various participants, events, actions, and/or images for insertion into and consideration by the knowledge graph.

Additionally, once the knowledge graph architecture has been constructed, it can continually be updated and grown by adding more and more pertinent data, from one or more individual's, into the knowledge structure, building more and more potential nodes and/or relationships. In such an instance, the bounding nodes may be of any combination of nodes, and as such, in certain instances, may be user selectable. For instance, in various embodiments, the system may be configured for being accessible by a third party, such as by the individual themselves, an event and/or system administrator overseeing the administration of the system, a third-party user, and the like. In such an instance, the user may access the AI module, e.g., via a suitably configured user interface, upload pertinent information into the system and/or determine the relevant nodes by which to bound an inquiry, e.g., by clicking on or drag and dropping them via the dashboard interface, and may formulate a relevant question to be answered by the AI module. Accordingly, the user may review and/or select the bounding nodes, and then allow the system to generate an appropriate knowledge map employing the selected nodes, and determine the relationships between the nodes, from which relationships various inquiries may be queried and answered, or at least be inferred, e.g., by the AI system.

For example, in one use model, a user may be a participant in an event, a judge or a coach, or other interested third party, or the like who desires to know how a certain performance and/or evaluation thereof affects one or more results achieved at a later time, such as at a later performance and with respect to one or more conditions that may be promoting and/or preventing the participant or other system user or actor reaching their goals. Consequently, the user or the system itself may collect and upload input data, such as regarding a performance and/or a performer thereof, which may be in the form of one or more captured images or scores or evaluations, a description of the same, and/or the circumstances surrounding the event, performer, other system user, and/or their performance. With this data the AI module may generate a suitable knowledge graph (and/or add to an already existing knowledge graph), from which knowledge graph the bounding nodes may be selected and various relationships between the nodes may be determined. Further, in various instances, a participant's performance, characteristic, condition, and/or history data, may be correlated within the knowledge graph with the various scores and/or evaluations that may be known or expected to be associated with those factors from which data points within the graph and various respective relationships may be determined, inferences assessed, and predictions made.

Specifically, in various embodiments, an overseeing event and/or system administrator and/or performer or coach may capture, upload, and/or review one or more captured images, or other content, with respect to an individual performance of an actor or other user of the system within an event and/or may perform one or more evaluations of the performance, and enter the data into the system so as to build out the performer's and/or bettors and/or judges and/or evaluator's personal profile within the system, such as with respect to the activities they participate in within the system. This data may then be employed to define one or more goals of the individual and/or delineate one or more conditions that the individual may be experiencing, such as a condition that may be preventing them from reaching their goals, such as where the condition may be an action that if changed can help them advance their goals. From these data one or more nodes within a knowledge graph characterizing that individual may be generated and one or more nodes representing one or more actions to be improved upon may be populated and be evaluated for formulating an individualized plan of improvement to be engaged in by the individual at a predicted or otherwise determined methodology so as to help that individual meet their performance goals.

Particularly, with this data the AI module may generate a suitable knowledge graph (and/or add to an already existing knowledge graph), from which knowledge graph the bounding nodes for the individual, their conditions, goals, and one or more activities to be evaluated and/or improved, may be selected and relationships between them determined. A workflow for an improvement calculation may be worked up, entered into the system, a query may then be run, and a predictive model may be initiated on the data to determine one or more relevant query results that are particular to the individual's personal characteristics, goals, and performance activities with respect to the generated work up.

Accordingly, the present system may be configurable so as to account for the personal characteristics of an individual, both with respect to their personal conditions and their performance goals, as well as with respect to various images that can be used to express their current performance level and the level of performance they should be at, such as to reach those goals. Likewise, the system may include a large database of performance images, condition data, and the characteristics that describe them, which may be known to be beneficial in positively affecting one or more known desirable outcomes. This data may serve as a set of first nodes of a knowledge graph, and may be built from a wide variety of successful performances, which can be aggregated, a composite built, and that composite can be used to compare to a set second nodes related to the performance of a performer in their desire to achieve better results with regard to the actions they take in the implementation of their performance, such as where a third set of nodes may be represented by their improvement goals. The system, therefore, may analyze the performance based characteristics of the performer in relation to the model performance characteristics, and may determine various conditions and/or characteristics that can affect, e.g., improve, one or more conditions that may be predicted to effectuate the desired improvement, based on an analysis performed by the system, such as based on one or more inferences made by the system.

In any of these instances, these characteristic data may be uploaded into the system and may be populated into one or more knowledge graphs of the system, whereby various nodes may be identified and/or correlated from which data correlations and various relationships may be determined, inferences assessed, calculations performed, and predictions made and/or reported. For instance, in such a manner, this data, as well as any other relevant data, along with all properties relevant to a particular query to be analyzed, may be uploaded into the system and be used to form a constellation of nodes, which nodes may be employed to determine various relationships pertinent to the individual, such as by querying the system and allowing it to generate the appropriate connections from which an answer may be inferred. Once populated in a manner such as this, one or more queries may be run against the data so as to isolate various sub-profiles that may then be mined for relevant relationships and/or correlations.

Specifically, these characteristic data may then be employed by the AI module so as to determine one or more correlations and/or to perform one or more calculations with respect thereto. These calculations may be made so as to thereby derive and propose an identity and/or performance profile, e.g., for a performer in an event. In various instances, an analysis may be performed with respect to determining one or more conditions or activities that can be improved on, and may further calculate a proposed model for effectuating that improvement, such as for each activity desired, so as to help the individual achiever their performance goals.

The results of the performer's attempt to improve their performance activities may also be entered into the system and tracked over the course of time. In various embodiments, these results may be used to generate a collective knowledge graph of a plurality of improvement steps from a plurality of individuals, and/or for each individual over a longer period of time. In such an instance, pertinent data may be entered into the system, and any relationships between them may be determined by the AI module. Relationships between two or more characteristics in a subject, or between subjects, may then be determined. For example, in such a manner as this, a subject's earlier conditions and/or characteristics may be correlated with their later performance characteristics. This may be done for a single individual or multiple individuals, e.g., forming a population of individuals.

Particularly, in one use model, a relationship between two properties, e.g., property A: an individual's performance characteristics and conditions, and property B, one or more characteristics and conditions of a model performer engaging in a model performance, may be determined by the system. Specifically, a series of historic data for each property, e.g., of an activity and/or a condition associated therewith, may be entered into the system, e.g., 1,000 readings of each. The machine learning platform of the system may then analyze the readings, and/or determine one or more correlations and/or relationships between the two properties. Any of a number of correlations may be made such that if a given property, e.g., condition A, is entered into the system, the predicted property, e.g., outcome improvement B, may then be output, such as by being inferred, taking the predictive weights between the two into account.

In such an instance, when evaluating the inputs with reference to properties A and B, a relationship between the two may be determined by the artificial intelligence processor. For instance, if given a new input for property A', such as the performance of the performer at a later time, is entered into the system, both performances A and A' can be compared with respect to ideal performance B, and the relationships between all three nodes can be determined and may then be used to predict what the outcome of new performance A" will be, given that these various properties are in fact mathematically related. This machine learned relationship may, therefore, be employed to determine when the various properties of A, A', A", and B are in alignment with one another, e.g., everything is progressing as it should, and, may further be used to determine when things are not functioning in alignment, such as when the predicted outcome is not observed, and thus, is indicative of their being a problematic state in the improvement of performance.

In certain instances the relationship between two or more properties are not linear, but rather may be more complex. For instance, in certain embodiments, the artificial intelligence module may be configured to model more complex processing of relationships in a manner similar to a neural network, such as in a deep learning protocol. Accordingly, although in some instances, the relationships may be configured in a linear array, such as to form a direct linkage between the properties, in other instances, the relationships may be layered one on top of the other so as to form a stacked, e.g., neural, network of information. Hence, in particular instances, the relationships may be formed in a multiplicity of stages and/or levels, where one level of information is connected to the next level of information, such as in a deep learning protocol.

Additionally, the relationships between the various properties from one, or the same, level to another may be strengthened, and therefore given greater weight, or weakened, and consequently given less weight, by the machine learning protocol engaged. Accordingly, as information is processed and allocated across the properties in the different, or same, levels of the system, at each stage, a variety of different points are being given greater and greater, or lesser and lesser, weights, such that when given a particular input, the AI module may more efficiently predict a given outcome more accurately based on the various different levels of weighted historical information. For example, the AI system may be adapted so as to process information in a layered or multi-staged fashion, such as for the purpose of deep learning.

Accordingly, the system may be configured to evaluate data in stages. Specifically, the AI module may be adapted such that as it examines various data, such as when performing a learning protocol, stage by stage, level by level, where each connection between data gets weighted by the system, e.g., based on historical evidence and/or characteristics of relationships. The more stages and/or levels of learning that are initiated within the system the better the weighting between junctions will be, and the deeper the learning.

Further, uploading data in stages allows for a greater convergence of data within the system. Particularly, various feature extraction paradigms may also be employed so as to better organize, weight, and analyze the most salient features of the data to be uploaded. Additionally, in order to better correlate the data, one or more users may input and/or modulate basic weighting functions, while the system itself may employ a more advanced weighting function based on active learning protocols.

Particularly, a deep learning protocol may be employed in training and implementing a search function of the disclosure as discussed herein. More particularly, deep learning is a paradigm where increased levels of datasets are employed in generating an answer to a query. If there is only one stage of learning involved, when answering a query, the network architecture may be configured as a neural network. However, if the determination implements a multi-stage learning process, when deriving an answer to a query, the architecture may be configured as a deep learning network. The more stages there are, where each stage includes a weight, the deeper the learning will be. But, with each stage added, the computing power required to make the data converge becomes greater and greater. Specifically, with each additional data set being processed, another node is generated, which increases the level of future processing power.

With respect to the present disclosure, when running a deep learning protocol, the process may first implement a feature extraction protocol. In the deep learning protocol salient features may be extracted and considered in comparison with similar features stored in a database of previously extracted features. In such an instance, each feature represents a characteristic that may be categorized into one or more classes or labels, which labels may be used to recognize patterns whereby the machine can therefore be trained to recognize the reoccurrence of those patterns in other representations, and thereby draw conclusory predictions based on those recognized patterns.

Accordingly, in order to perform machine learning there may be a library of functions that is generated. This is useful, for instance, where an anchor characterization may be identified, such as of a problematic condition. Subsequent analysis or distribution need not involve analysis or distribution of the entire subsequent characterizations, but rather, only data pertaining to any differences or divergence from the anchor, such as in response to an administered wellness agent. This is termed herein as feature extraction, the preferential analysis of the anchor characterization, or in some instances, only the deltas.

In various instances, methods disclosed herein are directed to using labels, e.g., pointers, to categorize and structure a database, such as for use in the artificial intelligence module to analyze data therein. In such machine learning the data may be first cleaned and prepared for feature extraction, e.g., such as with respect to image capture data and the various characteristics and features included therein. Such data, once extracted may be captured with respect to an individual, a group of individuals, a population, and may be based on one feature, a plurality of features, etc. thereby building a library of features as data is coming into the system. And once the data is in the system must train the machine to build the graph assembly so as to generate potential levels of correspondences. Such correspondence can fall within ranges, for instance, where a substantial amount, e.g., of correspondence or similarity, may be within a range from about 95% to about 100%, a high degree of correspondence may be within a range from about 90% to about 94%, a good degree of correspondence may be within a range from about 85% to about 89%, a moderate degree of correspondence may be within a range from about 80% to about 84%, an average degree of correspondence may be within a range from about 75% to about 79%, a below average degree of correspondence may be within a range from about 70% to about 74%, a low degree of correspondence may be within a range from about 65% to about 69%, a very low degree of correspondence may be within a range from about 60% to about 64%, and an extremely low degree of correspondence may be within a range from about 50% to about 59%.

As indicated, the AI system may be configured for answering a query, such as from a coach, evaluator, and/or a performer seeking to improve their performance, with respect to evaluating and improving performance. Accordingly, when performing a search function by the AI repository or database, the database may be configured as a relational database, wherein the architecture of that database is such that it is structured as a table or tree, or the architecture may be configured such that data is stored therein in a graph form, such as a knowledge graph, as described above. Additionally, when performing a search of the database, the search may be an effect based or an inference based search query.

An effect based search is typically one where the outcome is known and/or expected, whereas in an inference based search, the outcome is not known. Although table based searching is useful, it is based on known relationships that are categorized by tables, which may be searched by using the known key. Such searching is generally effect based searching, where the answer is known, and the relationship with its query simply needs to be identified, e.g., via the use of the key. Inference based searching, on the other hand, is where the relationship between two or more data points is unknown, but to be determined based on the building of a knowledge graph and the learnings of the system with respect to other relationships and the rules of those relationships, allow for new relationships to be discovered and otherwise unknown outcomes to be determined.

As such, it is the generation and implementation of the knowledge graph is a useful feature of the present search function in an inference based learning schema upon which the machine learning and inference engines, as herein described, are primarily built. Hence, as data flows into the database, it is formulated into one or more of these, or another, such structure. The data, e.g., where its relationship to other data is known, may then be employed to train the search function of the system to determine data points and/or relationships between data points where the relationship was not heretofore previously known, that is a key is not required to determine the presence of the relationship.

Specifically, once the known relationships have been determined, through a training process, the newly trained system, and the rules developed, may then be employed to infer other relationships, heretofore unknown, between the data points with a probability establishing the prediction that the inferred relationship is in fact an actual relationship. In such a manner, various performance data of a performer or scorer or evaluator may be entered into the system, as one set of a collection of data points. Likewise a set of characteristics of a variety of performance data of the same or different performers at a different time may also be entered into the system as well.

This data may be employed to build a knowledge graph whereby the various relationships, known and inferred, between these data may be determined, and the differenced and/or similarities flagged for further analyses. This may be done for one or a plurality of subjects, where the relationships and the learnings therefrom may be used to determine known outcomes, such as for training the system, and once suitably trained the system may then employ these learnings in determining heretofore unknown relationships so as to infer outcomes therefrom. Hence, known facts and relationships may be used to train the AI engine, which once trained may determine rules by which unknown relationships may be determined and outcomes based on those relationships may be inferred and/or otherwise determined, such as by a suitably configured inference engine of the system.

More particularly, an individual may be subjected to an interview process whereby one or more data points pertaining to one or more conditions affecting one or more of their performance goals is described and entered into the system. The system may then receive this data, and one or more features may be extracted, and one or more nodes may be formed, which as described above, and may be used to generate a knowledge graph. In various instances, the entered data may be reviewed by a coach or other performance evaluator, for review and/or identification, and/or for verification and authentication purposes, and thus, this data is known, and may therefore be fact-based data. Such data, for instance, may be entered into the system, such as through a graphical user interface presented on a client computer of the system.

In such a manner, one or more conditions pertinent to the individual, e.g., determined based on an analyses performed of one or more images capturing the performance, from one or more performer's, may be entered into the system such as via a remote interface, such as via an image capturing device that is coupled to an associated client computer. The condition data may be any data of significance to the individual affecting their performance goals, such as health data, condition data, environmental data, psychological data, social network data, and the like. Likewise, as discussed herein above, such condition data may also be uploaded into the system, such as annotated coaching data, and may then be correlated with one or more performance indicators determined to be relevant to one or more of the conditions, such as via the AI module of the system. In various instances, the system may be configured such that this data may be uploaded into the system automatically, from one or more sources.

Accordingly, the AI system server, e.g., the machine learning and inference engine implementations, may be positioned remotely from the location from where the performance data is uploaded into the system, but may be accessed locally or remotely as described herein. This data serves many purposes, one such purpose being the training of the AI module, and/or its use in one or more predictive models. In such training, known relationships and outcomes can be treated as if they are unknown, and consequently the machine may be made to determine the relationships and predict the outcomes anew, which training may continue until the system has learned to predict the right outcome.

Particularly, this training, e.g., two class-model training may be used for a sub-portion of the data, e.g., 50%, the training portion, and the other data may be used to test the learnings from the training portion to predict the known outcomes, with respect to the other 50% of the data. Hence, the first portion of the data may be employed to develop a training model, and the second portion of the data may be used to test the training models to enhance the accuracy of a predictive model. Once sufficiently trained may be employed to make other inferences and thereby predict other outcomes.

For example, once trained, the inference engine may be employed to search the database in response to a user enter query and based on the known and/or inferred relationship between the various data of the system an answer to that query may be inferred and an outcome predicted, e.g., a given request may be input into the system, and an answer may then be generated by the system based on the relationships between the data. One, two, three, or more inputs may be entered into the system, in addition to a query, and an output may be determined and returned by the system. For instance, a participant's, e.g., performer's or scorer's or bettors, performance profile may be correlated with their historical performance data and/or their future performance goals, and be uploaded into a database of potentially correlated data from other participants. The system may then perform a comparison between the performance data of one or more other performers, such as for use in training and/or the development of predictive models. Specifically, as indicted above, the data entered into the system may be used to train the system, and once trained the system may be employed to make one or more correlations or predictions, therewith, such as in response to a query.

Particularly, in one embodiment, the system may be configured for performing a machine learning process on received judgments, evaluations, bets, and/or comments, in this instance scoring, judging, and/or betting, so as to determine if one or more entered scores or bets fall outside of a predicted range, and/or to implement a system generated scoring or betting regime so as to improve the actual activity as compared to a predicted outcome for that activity. For instance, at a first step, a series of captured images, e.g., photographs or videos, of a performance or a judgement or bet with respect thereto may be collected and may be split between images, judgments and/or bets, and containing performances, judgments, and bets that have been made correctly and won, and images, judgements, and bets containing performances that have not been made correctly or bets that have been made and lost. Of the set of scored images and bets won, this set may be divided into a first and a second test group.

In such an instance, the system can use a first, untrained model to generate a first predictive set of scores, judgments, or bets for the images, judgments, and bets in the first lot. Specifically, the images, judgements, and bets in the first lot may be broken down into component parts, and the rules by which to evaluate those component parts may be generated and applied so as to score those component parts as well as to score the images, judgments, and bets over all. This machine generated predictive score may then be compared to the score actually received by one or more of a judges, a crowd, bettor, or other evaluator. Where the difference between the predicted and the actual score outcomes is great, such as greater than 40%, greater than 30%, greater than 20%, greater than 15%, greater than 10%, greater than 5%, greater than 1%, dependent on how the system is configured, then one or more changes to one or more of the rules and how the rules are to be weighted and applied may be changed and the process may be repeated.

However, where the difference is lower than 20%, lower than 15%, lower than 10%, lower than 5%, lower than 1%, dependent on how the system is configured, then a model "A" may be generated based on the system configuration, whereby the model "A" may be applied to the captured images, judgements, and bets in the second test lot. In such an instance, the model "A" may be applied to the images in the second test group so as to score those images, judgements, or bets, and/or their component parts. These "A" predicted machine generated scores may be compared with the actual judge, crowd, bettor, and/or other evaluator scores, and a difference may be determined. If the difference is greater than 1%, greater than 0.01%, greater than 0.001%, greater than 0.0001%, greater than 0.00001%, then the model may be changed, such as by changing one or more rules and/or weightings associated therewith, and the model can be reapplied. However, where the difference is lower than 1%, lower than 0.01%, lower than 0.001%, lower than 0.0001%, lower than 0.00001%, then the finalized model "B" may be applied for use in a variety of different analyses, such as for determining when a predicted score, judgement, or bet by one or more actors is outside of a determined range, thus, indicating the potential for bias or a need for improvement, or as in this instance, to generate one or more system produced better score or betting regimes should be implemented.

Accordingly, in various instances, the system may include an inference engine, such as configured as a neural network, that is adapted for receiving a plurality of inputs, performing an analysis of the data, and generate one or more correlations between the various data points. In particular instances, the system is configured for allowing the inference engine to be accessed remotely, such as via a cloud based interface accessed through a client computer, such as a HUD or other client computing device of the system. Once accessed, information pertaining to a particular subject may be uploaded onto the system, or if already uploaded may be accessed, such as by a generated identifier key.

For instance, once uploaded, the system may feed the subject's data into a knowledge graph of the system with respect to a given population of interest. Specifically, the system may receive the subject's data, and based on an initial analysis of the data may tag and store the data in relation to one or more populations to which the data may be fit. Such groupings may be made based on a number of characteristics, including performer condition data, such as age, weight, gender, medical conditions, prescribed medicines or treatments, social network data, demographics (national origin, ethnic/religious background, sexual orientation, etc.) and the like.

This data may be uploaded into the system, and may serve as nodes for generating part of a knowledge graph pertaining to a first performer, in relation to others in the defined population of interest, where each node may be defined by a number of properties. Once the pertinent group has been defined with respect to evaluating a performance of an individual vis a vis another individual, or the same individual at a different time(s), and the relevant properties, particulars, and/or metrics may be characterized within the knowledge graph, the inference engine may then be employed so as to determine both known and inferred correlations between the various data points and/or their characteristics. Such inferences may be performed automatically, or in response to an entered query.

Particularly, in one use model, a coach may access the inference engine via a graphical user interface of a computer at his office, he may then select content to be viewed and annotated, which annotations along with the performer performance and condition information may be uploaded into the system as well. This information may be encrypted and transmitted to a central repository, e.g., server system, which may receive the encoded data, de-encrypt it, and use the data to build a knowledge graph, by pulling up data from other subject's that have correspondingly related characteristics, performances, and conditions so as to generate the nodes of the graph.

The coach, bettor, or other evaluator may then enter a query by which to initiate a search of the data base, and the inference engine in response to the query can then define the relationships between relevant nodes, and form those known relationships either return an answer, or generate, e.g., infer, further heretofore unknown relationships by which an answer may be determined and returned to the coach along with a predictive quality score, e.g., a score indicating areas by which a performer, bettor, or other actor performed well and other instances showing how the performance or bet or other action may be improved. Based on the confidence score and/or other pertinent factors the rules that the inference engine uses to define the various relationships between particular nodes in the knowledge graph may be adjusted to be stricter or more lenient as to what data points and which relationships will be considered as valid when making a given predictive model, e.g., which nodes may be considered as objects, which may be considered as subjects and predicates, and which may be correlated as objects.

Consequently, once the various relationships have been defined and weighted, a predictive query, such as in the form of an "If"/"Then" statement may be made, such as where the physician enters a query into the system, and the inference engine determines the "then" portion of the statement by employing a predictive model to generate a resultant outcome, such as based on a probability outlook. Hence, the coach r bettor or other actor may enter their subject's conditions and/or present characteristics along with their performance goals, and a proposed improvement plan, and the inference engine may then use that data to build a knowledge graph whereby the system may then return a proposed outlook for the subject with relation to them improving their performance by implementing the improvement plan, and/or may suggest alternative or supplemental methodologies to be engaged in that may be useful to implement in substitution or in addition to the originally proposed activities of the improvement plan.

Particularly, the present system in this manner will be useful in determining bias or trends or patterns in scoring, betting, evaluation and improvement of performance, identification of performers, as well as predictability of performance or betting events for one or more participants r actors with respect to an event, such as by taking into account one or more of their prior performances and comparing it with historical performances of themselves and/or others.

In various instances, certain aspects of the artificial intelligence module may be accelerated, such as by being implemented in hardware, such as by a suitably configured integrated circuit, such as by an FPGA, ASIC, Structured ASIC, and the like. For instance, in certain embodiments, the AI system may be configured to model a neural network, including a deep learning neural network, which may be formed of layers and layers or processing engines, where the more layers provided the deeper the learning configuration, and where each processing engine is trained in accordance with the methods disclosed herein to perform predictive analyses, which based on the number of layers may allow for exponential analyses to be performed.

One or more aspects or features of the subject matter described herein may be realized in digital electronic circuitry, integrated circuitry, specially designed ASICs (application specific integrated circuits), FPGAs (field programmable gated array), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, hardware, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT), or a liquid crystal display (LCD), or light emitting diode (LED) or (OLED) monitor, a capacitive sensing touch screen, for displaying information to the user and a keyboard and a pointing device, such as for example a mouse or a trackball, by which the user may provide input to the computer. In various instances, the display screen may be a capacitive sensing interactive touch-screen display. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), WIFI, and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

The methods illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein.

Although a few embodiments have been described in detail above, other modifications are possible. Other embodiments may be within the scope of the following claims.

The invention claimed is:

1. A system comprising:
a first set of processing engines for generating a content studio for presentation at a display of a client computing device, the set of processing engines of the content studio implementing machine operable instructions for generating one or more interactive view panels that are configured to display video content selected by a user, the video content being received by the content studio from a plurality of video cameras in communication with the content studio, and being based on one or more event particulars selected by the user, the content studio further including at least one of a streaming control and/or an output control to respectively control streaming and/or output of the video content from the content studio;
a second set of processing engines for implementing machine operable instructions for generating a software-as-a-system (SaaS) platform having one or more inputs and one or more outputs, each of the one or more inputs being configured for receiving selected video content from the content studio in accordance with the user selection, each of the one or more outputs having a uniform resource locator (URL) that can be rendered in a website of a customer computing system that is configured for displaying the selected video content in the rendered URL, the SaaS platform further having a third set of processing engines for implementing machine operable instructions for generating a mapping module for mapping each of the one or more inputs to a determined at least one of the one or more outputs, based on the user selection;
a fourth set of processing engines for implementing machine operable instructions for generating a connection framework for implementing machine operable instructions configured for establishing a connection between one of the one or more interactive view panels of the content studio and a selected input of the one or more inputs of the SaaS platform based on an application programming interface (API) call from the content studio to the SaaS platform upon activation of the content studio to display the video content selected by the user, and
a fifth set of processing engines for implementing machine operable instructions for generating a betting module, the betting module for producing a further interactive view panel capable of being engaged with by the user so as to thereby receive one or more bets from the user, the one or more bets pertaining to an activity being performed within the displayed video content.

2. The system in accordance with claim 1, wherein the content studio further includes a palette of editing tools, each of the editing tools being configured to enable editing by the user of the video content received by the content studio and displayed in at least one of the one or more interactive view panels.

3. The system in accordance with claim 1, wherein the mapping module is configured to map each of the one or more inputs to at least one of the one or more outputs based at least in part on one or more of: a source of the video content, a recipient of the video content, a relevancy factor, a parameter, a metric, a trend, a tag associated with the video content, availability of output channel or performance.

4. The system in accordance with claim 1, wherein the mapping module further comprises an artificial intelligence unit that is configured to assist in mapping each of the one or more inputs to at least one of the one or more outputs.

5. The system in accordance with claim 2, wherein the palette of editing tools includes one or more graphical control buttons to enable one or more of annotating a video file, merging two video files into a merged video, displaying two or more video files simultaneously, and displaying two or more video files synchronously.

6. A computer-implemented system comprising:
a first set of processing engines for generating a management hub, the management hub being configured to execute machine operable instructions to receive input representing details of an event, the details including one or more of a time, a duration, a location, an identification of one or more participants of the event, and a schedule of participation of the one or more participants of the event;
a second set of processing engines for generating a content studio for presentation at a display of a client computing device, the set of processing engines of the content studio implementing machine operable instructions for generating one or more interactive view panels in a display of a computing device, the content studio being configured to display video content from the event supplied to each of the one or more interactive view panels and to tag the video content according to one or more of the time, the duration, the location, the identification of one or more participants of the event, and the schedule of participation of the one or more participants of the event, the video content being provided to the content studio by a plurality of video cameras connected with the content studio via a communication network, the content studio further including at least one of a streaming control and/or an output control to respectively control streaming and/or output of the video content from the content studio;
a third set of processing engines for implementing machine operable instructions for generating a content distribution platform having one or more inputs and one or more outputs, each of the one or more inputs being configured for receiving user selected video content from the content studio via an application programming interface (API) call from the content studio to the content distribution platform upon activation of the content studio to display the video content selected by the user, each of the one or more outputs having a uniform resource locator (URL) that can be rendered in a website of a computing system that is configured for displaying the selected video content in the rendered URL; and
a fourth set of processing engines for implementing machine operable instructions for generating a betting module, the betting module for producing a further interactive view panel for presentation at the display of a client computing device, the further interactive view panel being capable of being engaged with by the user so as to thereby receive one or more bets from the user, the one or more bets pertaining to an activity being performed within the event being displayed in the video content.

7. The computer-implemented system in accordance with claim 6, wherein the content distribution platform further includes a mapping module including machine operable instructions configured for mapping each of the one or more inputs to at least one of the one or more outputs.

8. The computer-implemented system in accordance with claim 6, wherein the content distribution platform is further configured to output the video content selected by the user based on at least one tag selected by the user of the customer computing system.

9. The computer-implemented system in accordance with claim 7, wherein the mapping module is configured to map each of the one or more inputs to at least one of the one or more outputs based at least in part on one or more selections made by the user.

10. The computer-implemented system in accordance with claim 7, wherein the mapping module is configured to map each of the one or more inputs to at least one of the one or more outputs based at least in part on a destination of the video content, the destination comprising the customer computing system.

11. A computer-implemented method comprising:
receiving, at a first set of processing engines for generating a management hub of a computing system, input representing details of an event, the details including one or more of a time, a duration, a location, an identification of one or more participants of the event, and a schedule of participation of the one or more participants of the event;
displaying, in a second set of processing engines for generating a content studio having instructions for generating one or more interactive view panels in a display of a computing device, video content from the event supplied to each of the one or more interactive view panels, the video content being provided to the content studio by one or more video cameras connected with the content studio via a communication network;
tagging, via the content studio, the video content according to one or more of the time, the duration, the location, the identification of one or more participants of the event, and the schedule of participation of the one or more participants of the event;
controlling, via the content studio, a streaming and/or an output of the video content from the content studio to a content distribution platform having one or more inputs and one or more outputs, each of the one or more outputs having a uniform resource locator (URL) that can be rendered in a website of a customer computing system that is configured for displaying the selected video content in the rendered URL;
delivering, to at least one input of the content distribution platform, selected video content from the content studio via an application programming interface (API) call from the content studio to the content distribution platform upon activation of the content studio to display the video content selected by a user by the customer computing system; and
generating a betting module, the betting module for producing a further interactive view panel for presentation at the display of a client computing device, the further interactive view panel being capable of being engaged with by the user so as to thereby receive one or more bets from the user, the one or more bets pertaining to an activity being performed within the event being displayed in the video content.

12. The computer-implemented method in accordance with claim 11, wherein the content distribution platform further includes a mapping, by a mapping module of the content distribution network, each of the one or more inputs to at least one of the one or more outputs.

13. The computer-implemented method in accordance with claim 11, outputting, by the content distribution network, the video content selected by the user based on at least one tag selected by a user of the customer computing system.

14. The computer-implemented method in accordance with claim 12, wherein the mapping module is configured to map each of the one or more inputs to at least one of the one or more outputs based at least in part on a source of the video content.

15. The computer-implemented method in accordance with claim 12, wherein the mapping service is configured to map each of the one or more inputs to at least one of the one or more outputs based at least in part on a destination of the video content, the destination comprising the customer computing system.

16. A content distribution and fan input system comprising:
a first set of processing engines for generating a management hub, the management hub being configured to execute machine operable instructions to receive input representing details of an event, the details including one or more of a time, a duration, a location, an identification of one or more participants of the event, and a schedule of participation of the one or more participants of the event;
a second set of processing engines for generating a content studio for presentation at a display of a client computing device, the set of processing engines of the content studio implementing machine operable instructions for generating one or more interactive view panels in a display of a computing device, the content studio being configured to display video content from the event supplied to each of the one or more interactive view panels and to tag the video content according to one or more of the time, the duration, the location, the identification of one or more participants of the event, and the schedule of participation of the one or more participants of the event, the video content being provided to the content studio by a plurality of video cameras connected with the content studio via a communication network, the content studio further including at least one of a streaming control and/or an output control to respectively control streaming and/or output of the video content from the content studio;
a third set of processing engines for implementing machine operable instructions for generating a content distribution platform having one or more inputs and one or more outputs, each of the one or more inputs being configured for receiving selected video content from the content studio via an application programming interface (API) call from the content studio to the content distribution platform upon activation of the content studio to display the video content selected by a user, each of the one or more outputs having a uniform resource locator (URL) that can be rendered in a website of one or more computing systems that are configured for displaying the selected video content in the rendered URL;
a fourth set of processing engines for implementing machine operable instructions for generating a betting module, the betting module for producing a further interactive view panel for presentation at the display of a client computing device, the further interactive view panel being capable of being engaged with by the user so as to thereby receive one or more bets from the user, the one or more bets pertaining to an activity being performed within the event being displayed video content; and a backend server in communication with the content distribution platform and each customer computing system, the backend server receiving, from at least one of the one or more customer computing systems, user feedback associated with the selected video content.

17. The content distribution and fan input system in accordance with claim 16, wherein receiving user feedback includes receiving user feedback within a predetermined time period of displaying the selected video content.

18. The content distribution and fan input system in accordance with claim 16, wherein receiving user feedback further includes removing a bias from the user feedback.

19. The content distribution and fan input system in accordance with claim 16, wherein the user feedback includes a digital signal representing a quantitative evaluation of the selected video content.

20. The content distribution and fan input system in accordance with claim 16, wherein the user feedback includes a digital signal representing a qualitative evaluation of the selected video content.

\* \* \* \* \*